(12) United States Patent
Kawamura et al.

(10) Patent No.: US 12,263,573 B2
(45) Date of Patent: Apr. 1, 2025

(54) ROBOT-BASED WAITER OPERATION BASED ON MONITORING OF CUSTOMER CONSUMPTION ACTIVITY

(71) Applicant: TOSHIBA TEC KABUSHIKI KAISHA, Tokyo (JP)

(72) Inventors: Motonobu Kawamura, Kamagaya Chiba (JP); Masashi Fukuda, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 259 days.

(21) Appl. No.: 17/747,218

(22) Filed: May 18, 2022

(65) Prior Publication Data

US 2022/0274258 A1   Sep. 1, 2022

Related U.S. Application Data

(63) Continuation of application No. 16/289,468, filed on Feb. 28, 2019, now Pat. No. 11,364,638.

(30) Foreign Application Priority Data

Mar. 2, 2018   (JP) ................................. 2018-037850

(51) Int. Cl.
*B25J 11/00* (2006.01)
*B25J 9/00* (2006.01)
(Continued)

(52) U.S. Cl.
CPC ......... *B25J 11/0045* (2013.01); *B25J 9/0084* (2013.01); *B25J 9/1697* (2013.01);
(Continued)

(58) Field of Classification Search
CPC ...... B25J 11/0045; B25J 11/008; B25J 13/06; B25J 9/0084; G05B 19/41895;
(Continued)

(56) References Cited

U.S. PATENT DOCUMENTS

| 5,602,730 A | 2/1997 | Coleman et al. |
| 2004/0158494 A1 | 8/2004 | Suthar |

(Continued)

FOREIGN PATENT DOCUMENTS

| CN | 101661098 A | 3/2010 |
| CN | 101661098 B | 7/2011 |

(Continued)

OTHER PUBLICATIONS

Japanese Decision of Refusal mailed Nov. 16, 2021 in corresponding Japanese Patent Application No. 2018-037850, 6 pages (with Translation).

(Continued)

*Primary Examiner* — Khoi H Tran
*Assistant Examiner* — Tanner L Cullen
(74) *Attorney, Agent, or Firm* — Kim & Stewart LLP

(57) ABSTRACT

A robot service providing system includes a table monitoring terminal associated with one of a plurality of tables in a venue, a central control terminal, and a movable waiter robot. The central control terminal includes a communication interface, a display, an operation panel, and a controller. The controller is configured to control the display to display a screen including an image including a consumable item captured by a camera of the table monitoring terminal based on image data received by the communication interface, and control the communication interface to transmit a service instruction in response to a user operation on the operation panel. The movable waiter robot is configured to move to said one of the tables based on the service instruction.

19 Claims, 16 Drawing Sheets

(51) Int. Cl.
   *B25J 9/16* (2006.01)
   *B25J 13/06* (2006.01)
(52) U.S. Cl.
   CPC ..... *B25J 13/06* (2013.01); *G05B 2219/32128* (2013.01); *G05B 2219/37572* (2013.01); *G05B 2219/50391* (2013.01)
(58) Field of Classification Search
   CPC ........... G05B 2219/32128; G05B 2219/37572; G05B 2219/50391; G05B 2219/5039; G07F 17/322; G07F 17/32412; G06Q 50/12; G05D 2201/0216
   See application file for complete search history.

(56) References Cited

U.S. PATENT DOCUMENTS

| | | | |
|---|---|---|---|
| 2006/0111811 A1* | 5/2006 | Okamoto | G05D 1/0255 |
| | | | 700/214 |
| 2010/0179864 A1 | 7/2010 | Feldman et al. | |
| 2015/0206259 A1* | 7/2015 | Takahashi | G06V 20/52 |
| | | | 705/15 |
| 2016/0055677 A1* | 2/2016 | Kuffner | G06T 11/00 |
| | | | 901/1 |
| 2018/0009108 A1* | 1/2018 | Yamamoto | G01C 21/3874 |
| 2018/0043532 A1* | 2/2018 | Lection | B25J 9/1661 |
| 2018/0201444 A1* | 7/2018 | Welty | G05D 1/2446 |
| 2018/0247134 A1* | 8/2018 | Bulzacki | G06V 10/44 |
| 2018/0276770 A1 | 9/2018 | Cronin et al. | |
| 2019/0061166 A1 | 2/2019 | Dai et al. | |

FOREIGN PATENT DOCUMENTS

| | | | | |
|---|---|---|---|---|
| JP | 2004252497 A | * | 9/2004 | ................. B25J 5/02 |
| JP | 2009-172410 A | | 8/2009 | |
| KR | 20170112487 A | * | 10/2017 | .......... B25J 11/0045 |

OTHER PUBLICATIONS

Japanese Notice of Reasons for Refusal mailed Aug. 24, 2021 in corresponding Japanese Patent Application No. 2018-037850, 6 pages (with Translation).

* cited by examiner

ROBOT-BASED WAITER OPERATION BASED ON MONITORING OF CUSTOMER CONSUMPTION ACTIVITY

CROSS-REFERENCE TO RELATED APPLICATIONS

This application is a continuation of U.S. patent application Ser. No. 16/289,468, filed on Feb. 28, 2019, which is based upon and claims the benefit of priority from Japanese Patent Application No. 2018-037850, filed on Mar. 2, 2018, the entire contents of each of which are incorporated herein by reference.

FIELD

Embodiments described herein relate generally to a system to perform a robot-based waiter operation based on monitoring of a customer consumption activity.

BACKGROUND

Recently, there is a restaurant and the like where a waiter service is carried out by a robot. For example, after food and the beverages are put on a tray, a robot with the tray starts traveling according to a user operation. The robot travels along a predetermined path to a designated table to deliver the food and the beverages to the table.

A robot of the related art operates according to the user operation of the robot. Accordingly, the user has to be close to the robot to operate the robot. In addition, after the robot starts traveling, it is hard for the user to recognize an operational state of the robot.

DETAILED DESCRIPTION

Figure 1:
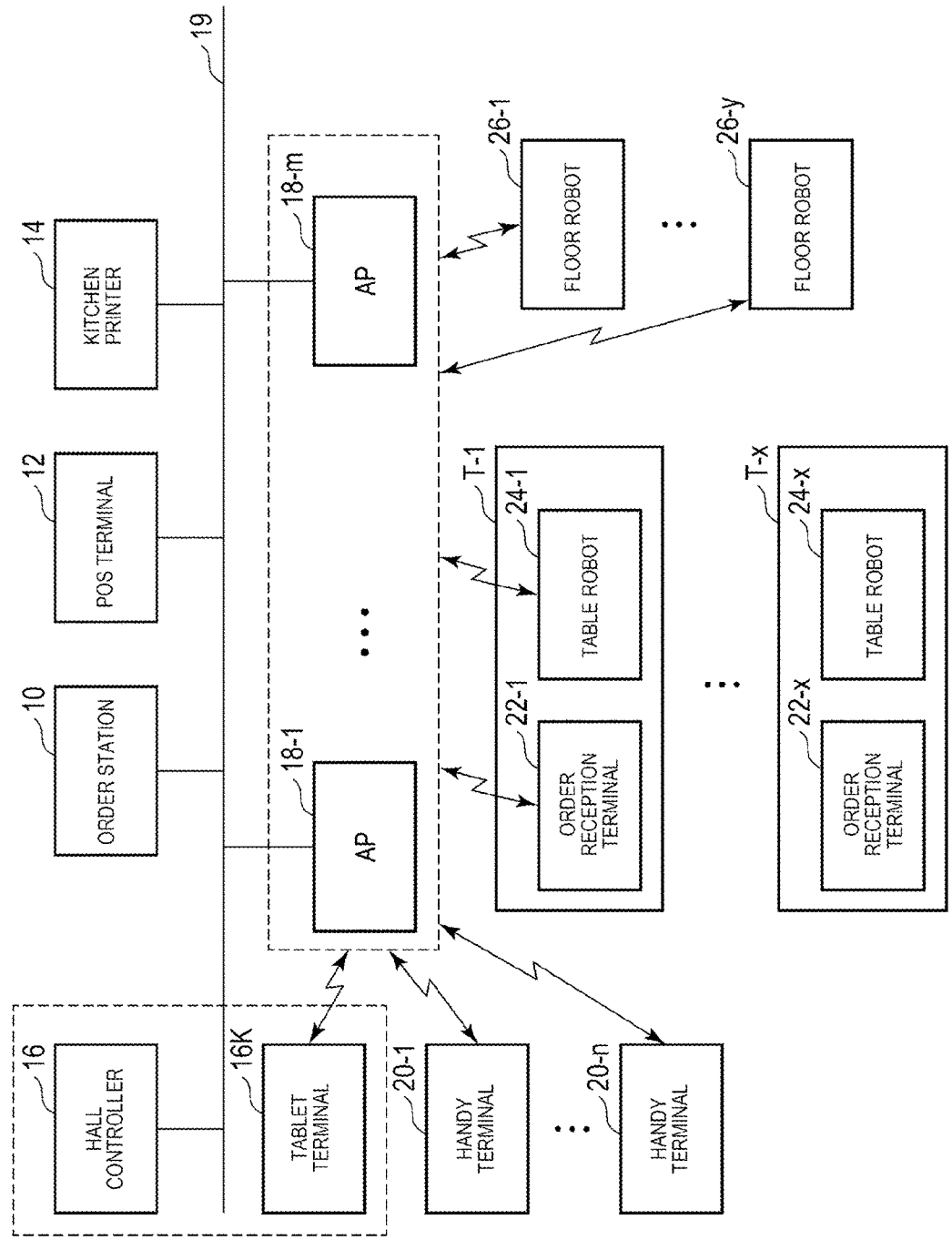
FIG. 1 is a block diagram illustrating an order processing system according to one embodiment.

According to an embodiment, a robot service providing system includes a table monitoring terminal associated with one of a plurality of tables in a venue, a central control terminal, and a movable waiter robot. The table monitoring terminal includes a camera, a driving mechanism configured to change a direction of the camera, a first communication interface, and a first controller. The first controller is configured to control the driving mechanism such that the camera is directed to at least a consumable item on an associated table, and control the first communication interface to transmit image data of an image including a consumable item captured by the camera. The central control terminal includes a second communication interface communicable with the first communication interface, a display, an operation panel, and a second controller. The second controller is configured to control the display to display a screen including the image based on the image data received by the second communication interface, and control the second communication interface to transmit a service instruction in response to a user operation on the operation panel. The movable waiter robot is configured to move to said one of the tables based on the service instruction. According to an embodiment, a system includes a table monitoring terminal associated with one of a plurality of tables in a venue, a central control terminal, and a movable waiter robot. The table monitoring terminal includes a camera, a driving mechanism configured to change a direction of the camera, a first communication interface, and a first controller. The first controller is configured to control the driving mechanism such that the camera is directed to at least a consumable item on an associated table, and control the first communication interface to transmit image data of an image including a consumable item captured by the camera. The central control terminal includes a second communication interface communicable with the first communication interface, and a second controller. The second controller is configured to compare the image data received from the table monitoring terminal at first timing with the image data received at the second timing, determine a remaining amount of the consumable item based on a comparison result of the image data received at the first and second timing, and generate service information upon the determining remaining amount decreasing to a predetermined threshold, and control the second communication interface to transmit the generated service information. The movable waiter robot is configured to move to said one of the tables based on the service information. According to an embodiment, a system includes a table monitoring terminal associated with one of a plurality of tables in a venue, and a movable waiter robot. The table monitoring terminal includes a camera, a driving mechanism configured to change a direction of the camera, a communication interface, and a controller. The controller is configured to control the driving mechanism such that the camera is directed to at least a consumable item on an associated table, compare image data of an image including a consumable item captured by the camera at first timing with the image data of the image at the second timing, determine a remaining amount of the consumable item based on a comparison result of the image data at the first and second timing, and generate service information upon the determining remaining amount decreasing to a predetermined threshold, and control the communication interface to transmit the generated service information. The movable waiter robot is configured to move to said one of the tables based on the service information.

Hereinafter, embodiments are described with reference to the accompanying drawings.

FIG. 1 is a block diagram illustrating an order processing system according to an embodiment. The order processing system is provided and utilized in, for example, a restaurant.

In the order processing system, an order station 10, a Point of Sales (POS) terminal 12, a kitchen printer 14, a hall controller 16, and at least one access point (AP) 18 (18-1, . . . , 18-m) are connected to each other through a network 19 such as a Local Area Network (LAN). In addition, a tablet terminal 16K, a plurality of handy terminals 20 (20-1, . . . , 20-n), a plurality of order reception terminals 22 (22-1, . . . , 22-x) and a plurality of table robots 24 (24-1, . . . , 24-x), which are respectively provided at tables in a restaurant, and at least one floor robot 26 (26-1, 26-y) is connected to the network 19 through a wireless communication with the access point 18.

The order station 10 transmits a cooking instruction to the kitchen printer 14 based on order information received from the handy terminal 20 or the order reception terminal 22. If delivering completion is received from the handy terminal 20, the order station 10 transmits the order information to the POS terminal 12 as sales information.

The POS terminal 12 is arranged on, for example, a checkout counter, and is used to settle a cost of eating and drinking by a guest. The POS terminal 12 registers and processes sales information, to perform settlement processing for each transaction. The sales information includes information of commodity or item sales specification for each customer.

The kitchen printer 14 is arranged at, for example, a cooking place or a kitchen. The kitchen printer 14 prints an order slip on which a commodity (menu item) ordered by the customer and a table identification number are indicated, based on the order information received from the order station 10 to output a cooking instruction indicated on the order slip.

The hall controller 16 is a computer operating as an information processing apparatus performing processing for controlling and managing the floor robot 26. The hall controller 16 manages a situation and/or a state (hereinafter referred to collectively as a situation) of the customer in the restaurant to control respective devices included in the order processing system according to the situation of the customer. The hall controller 16 manages, for example, a situation of a table where the customer takes a seat, customer information (number of people, gender, age, job, and the like), an order history, occupied time (time elapsed from taking the seat, remaining time up to a setting end time for a prix-fix menu), and the like. The hall controller 16 displays a screen for showing the situation of the customer. Employees, e.g., waitress and waiter, of the restaurant look at the screen of the hall controller 16. In addition, the hall controller 16 inputs imaging data indicating an area, including a table on which at least an item (beverage, food, and the like) is disposed, which is captured as an image capturing area, and performs processing for controlling an operation of the floor robot 26 based on the imaging data. The hall controller 16 inputs the imaging data captured by, for example, a camera provided in the table robot 24 (or order reception terminal 22) provided on the table. The imaging data may be any of a still image or a moving image (video). The hall controller 16 displays the video image (or images) based on the imaging data and outputs an instruction for controlling the operation to the floor robot 26 in response to an input operation by the employee who checks the video image (or the image) (first embodiment). The hall controller 16 detects a situation of the item, for example, a remaining quantity of the item and a state of a bowl (a glass, a dish, or the like) used to provide the item, by performing image processing on the input imaging data. According to a result of the detection, the hall controller 16 outputs an instruction for controlling the operation to the floor robot 26 at an appropriate timing (second embodiment).

The tablet terminal 16K is used as an input/output device of the hall controller 16. The tablet terminal 16K communicates with the hall controller 16 through the access point 18 and the network 19. Meanwhile, the tablet terminal 16K may directly perform the wireless communication with the hall controller 16 without connecting through the access point 18. The number of tablet terminals 16K is not limited to one, and a plurality of tablet terminals 16K may be provided.

FIG. 1 illustrates the hall controller 16 implemented by a specific computer connected to the network 19, but processing of the hall controller 16 described below may be performed by the tablet terminal 16K. Furthermore, the processing may be performed by not only one hall controller 16 (or the tablet terminal 16K) as described above but also the hall controller 16 in cooperation with another device (a plurality of computers or the order station 10). Therefore, in the present embodiment, any one of a form, in which the hall controller 16 is implemented by the computer connected to the network 19, and a form, in which the hall controller 16 is implemented by the tablet terminal 16K can be adopted.

The access point 18 is a wireless communication device for controlling the wireless communication with the tablet terminal 16K, the handy terminal 20, the order reception terminal 22, the table robot 24, and the floor robot 26. At least one access point 18 is arranged on, for example, a ceiling in the restaurant.

The handy terminal 20 is used by the clerk. The handy terminal 20 performs an input of the order, check-in processing of registering a customer who visits the restaurant, an input of completion of delivering the item ordered by the customer, and an output of a message according to a notification from the hall controller 16. The handy terminal 20 transmits the order information according to the input order and item information indicative of the item, of which delivering is completed, to the order station 10. The handy terminal 20 transmits various notifications to the hall controller 16 in response to the operation by the clerk.

The order reception terminal 22 (22-1, . . . , 22-x) is placed on, for example, each table T (T-1, . . . , T-x) in the restaurant. The order reception terminal 22 displays a menu and receives the order of the item (menu item) from the customer. The order reception terminal 22 transmits the input order information to the order station 10. The order reception terminal 22 displays a recommendation item screen according to the recommendation information output from the hall controller 16.

The table robot 24 (24-1, . . . , 24-x) is disposed on, for example, each table T (T-1, . . . , T-x) in the restaurant. The table robot 24 performs communication with the customer. The table robot 24 inputs the imaging data, indicating an area including the table on which at least an item (beverage, food, or the like) is disposed, which is captured by the camera as the image capturing area, and transmits the imaging data to the hall controller 16. In addition, the table robot 24 has a function of recognizing voice data input from a microphone, to perform a simple conversation with the customer and reception of an item order with voice of the customer. The table robot 24 includes a voice output function of outputting a message to the customer from the speaker, and performs an output of a response message, corresponding to the voice recognized through the voice recognition function, for conversation with the customer, and an output of a message according to the notification from the hall controller 16 or the order station 10.

Meanwhile, in FIG. 1, the order reception terminal 22 and the table robot 24 are implemented as separate devices. However, the order reception terminal 22 and the table robot 24 may be implemented as one device.

In addition, a function of controlling the floor robot 26 provided in the hall controller 16 may be implemented with the order reception terminal 22 or the table robot 24. In other word, the order reception terminal 22 or the table robot 24 (furthermore, a combination of the order reception terminal 22 and the table robot 24) may operate as the information processing apparatus which performs processing for controlling and managing the floor robot 26 (third embodiment).

The floor robot 26 is used to deliver the item to each table and to collect (bus) articles (tableware), such as dishes, and glasses, and waste, from each table in the restaurant. The floor robot 26 includes at least one placing table on which dish, bowl, glass and the like are placed. The floor robot 26 includes an autonomous travel function, to of traveling to a location of a designated table along a path predetermined based on the location of the table in the restaurant. The floor robot 26 includes, for example, anti-collision sensor, to avoid obstacles while traveling to the table.

The floor robot 26 includes a wireless communication function through the access point 18. The floor robot 26 receives, for example, an instruction input from the order reception terminal 22 or the table robot 24 by the customer, an instruction from the hall controller 16 according to the situation of the customer, or an instruction input through the operation by the employee, to perform operation according to the instruction. In addition, the floor robot 26 notifies the hall controller 16 of the location data indicating a current location through the access point 18 while traveling. The hall controller 16 displays, for example, on a floor map for displaying the table arrangement, information indicating the current location (operational situation) of the floor robot 26 on a path along which the floor robot 26 travels based on the locational data received from the floor robot 26.

The floor robot 26 includes an input/output device, such as a touch panel, a person authentication function based on an image captured by the camera, a voice recognition function of voice data input from a microphone, and a voice output function of outputting a message to the customer or the clerk from the speaker to perform communication with the customer and the clerk.

Figure 2:
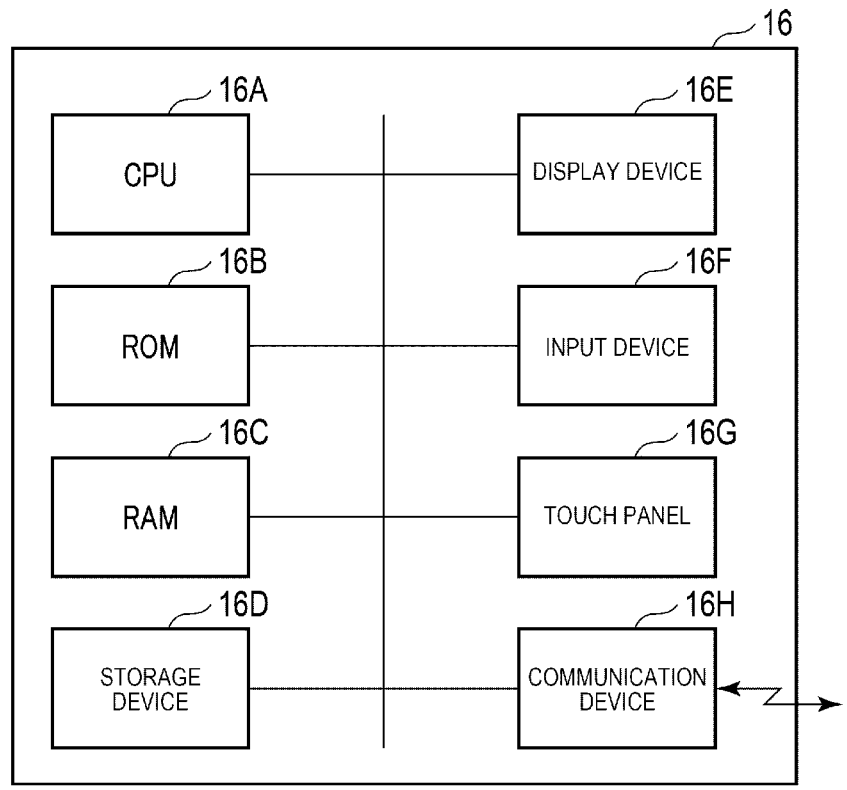
FIG. 2 is a block diagram illustrating an essential part of a hall controller.

FIG. 2 is a block diagram illustrating an essential part of the hall controller 16 according to the present embodiment.

The hall controller 16 is implemented by a specific computer. The hall controller 16 includes a Central Processing Unit (CPU) 16A, a Read Only Memory (ROM) 16B, a Random Access Memory (RAM) 16C, a storage device 16D, a display device 16E, an input device 16F, a touch panel 16G, and a communication device 16H.

The CPU 16A executes a program stored in the ROM 16B or the storage device 16D to control above respective devices of the hall controller 16. The program, executed by the CPU 16A, includes an information processing program to operate as the information processing apparatus, in addition to a basic program (Operating System (OS)). The CPU 16A executes the information processing program to manage the situation of the customer in the restaurant. The CPU 16A performs an input function of inputting the imaging data transmitted from the table robot 24 (or the order reception terminal 22) through the communication device 16H, a detection function of detecting the situation or state of the item (beverage and food) by performing the image processing based on the input imaging data, and an output function of outputting the instruction for controlling the floor robot 26 according to a result of the detection of the detection function. Status of the item detected by the detection function includes the remaining quantity of the item, and the status of the bowl, glass, dish and the like used to provide the item. As the status of the bowl used to provide the item, for example, it is desired to detect a state in which the customer does not need the bowl, such as in a state in which dishes overlap with each other or in a state in which the dishes are placed out of the table.

The CPU 16A performs recommendation information extraction processing for determining the recommendation information according to the customer based on information such as, for example, the situation of the table of which the seat is taken, management of customer information (number of people, gender, age, job, and the like), management of order history, and an occupied time (time elapsed from taking the seat, remaining time up to the setting end time of prix fixe menu, and the like).

The ROM 16B stores the program executed by the CPU 16A. The RAM 16C forms various work memory areas. The storage device 16D includes, for example, a Hard disk drive (HDD), and a Solid State Drive (SSD) to store various programs and various data.

The display device 16E is, for example, a Liquid Crystal Display (LCD). The input device 16F is, for example, a pointing device such as a keyboard or a mouse. The touch panel 16G performs display and input through touch operation thereon.

The communication device 16H controls communication with, for example, respective devices through the network 19. The communication device 16H may include a wireless communication function.

Figure 3:
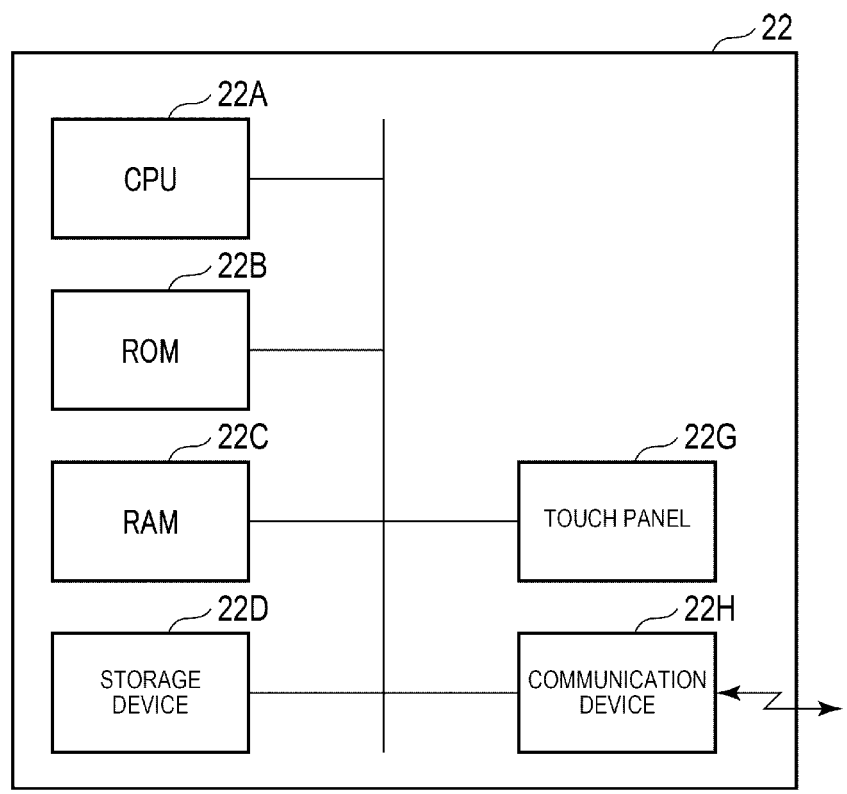
FIG. 3 is a block diagram illustrating an essential part of an order reception terminal.

FIG. 3 is a block diagram illustrating an essential part of the order reception terminal 22 according to the present embodiment.

The order reception terminal 22 is implemented by, for example, a specific tablet-type computer. The order reception terminal 22 includes a CPU 22A, a ROM 22B, a RAM 22C, a storage device 22D, a touch panel 22G, and a communication device 22H.

The CPU 22A executes a program stored in the ROM 22B or the storage device 22D to control operation sections of the order reception terminal 22. The program executed by the CPU 22A includes an order reception program (application program) to operate as the order reception terminal 22, in addition to the basic program (Operating System (OS)). The CPU 22A executes the order reception program to perform processing of displaying a menu screen, receiving an input operation by the customer, transmitting the order information to the order station 10 according to the item selected from the menus screen through the input operation by the customer, notifying (displaying or voice outputting) of a recommended item according to the recommendation information transmitted from the hall controller 16 (or the order station 10). The CPU 22A displays a screen (Graphical User Interface (GUI)) according to the respective processing described above on the touch panel 22G.

The ROM 22B stores program executed by the CPU 22A. The RAM 22C forms various work memory areas. The storage device 22D includes, for example, the HDD, and the SSD, to store the various programs and various data. The touch panel 22G performs the display and the input through touch operation. The communication device 22H controls the wireless communication with the access point 18.

Meanwhile, the order reception terminal 22 may include a similar function as the table robot 24 described below, and thus the table robot 24 can be omitted. In this case, the camera, the microphone, and the speaker are provided in the order reception terminal 22, and thus control functions, corresponding to the respective devices, which are similar to those of the table robot 24 described below, are provided.

Figure 4:
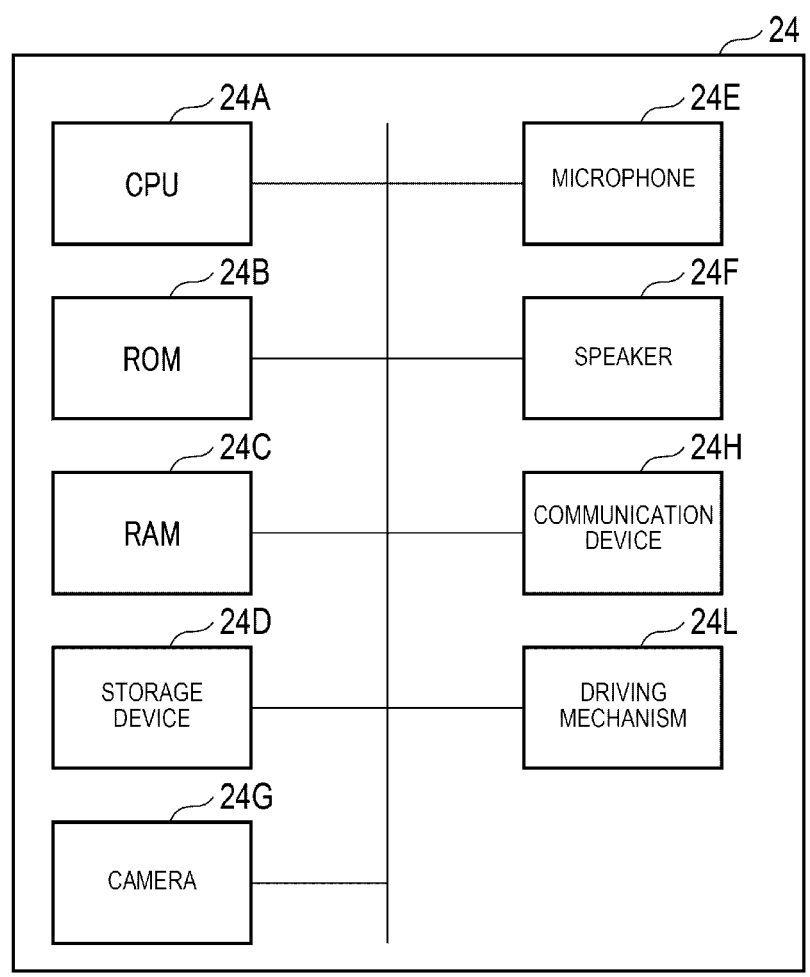
FIG. 4 is a block diagram illustrating an essential part of a table robot.

FIG. 4 is a block diagram illustrating an essential part of the table robot 24 according to the present embodiment.

The table robot 24 includes a function of the computer. The table robot 24 includes a CPU 24A, a ROM 24B, a RAM 24C, a storage device 24D, a microphone 24E, a speaker 24F, a camera 24G, a communication device 24H, and a driving mechanism 24L.

The CPU 24A executes a program stored in the ROM 24B or the storage device 24D to control the respective operation sections of the table robot 24. The program executed by the CPU 24A includes a control program to operate as the table robot 24, in addition to a basic program (Operating System (OS)). The CPU 24A executes the control program to control an operation of the camera 24G and performs an output function of outputting the imaging data captured by the camera 24G to the hall controller 16 through the communication device 24H. In addition, the CPU 24A executes the control program to control an operation for communication with the customer. The communication with the customer includes communication through the voice (conversation), communication through the operation, and the like. The CPU 24A performs a function of recognizing voice input from the microphone 24E, and a function of outputting voice from the speaker 24F to communicate with the customer through voice (conversation). The CPU 24A recognizes voice from the customer to perform the conversation, and to receive order of the item from the customer, using the function of recognizing voice. In the function of recognizing voice, for example, a predetermined voice command (word or sentence) can be recognized and thus processing according to the voice command can be performed. In addition, the CPU 24A uses the voice output function of outputting a response message answer to the voice, used to perform the communication, which is recognized through the function of recognizing the voice, and to output a message responding to a notification from the hall controller 16 or the order station 10.

The ROM 24B stores program executed by the CPU 24A. The RAM 24C forms various work memory areas. The storage device 24D includes, for example, the HDD, and the SSD, to store various programs and various data.

The camera 24G performs an image capturing under the control of the CPU 24A, to output imaging data. The camera 24G captures an image in a still form or a moving form (video). The communication device 24H controls wireless communication with the access point 18.

The CPU 24A operates the driving mechanism 24L. The table robot 24 includes a plurality of housings (for example, an upper housing and a lower housing), and a part of the housings can be moved by the driving mechanism 24L. The CPU 24A drives, for example, for the communication with the customer, the driving mechanism 24L in accordance with a normal state, conversation with voice, order of the item, and output timings of various message voice. The CPU 24A also drives the driving mechanism 24L such that a direction of the camera 24G is changed to change the image capturing area of the camera 24G.

The driving mechanism 24L has a mechanical structure in order to move at least a part of the housings of the table robot 24.

Figure 5:
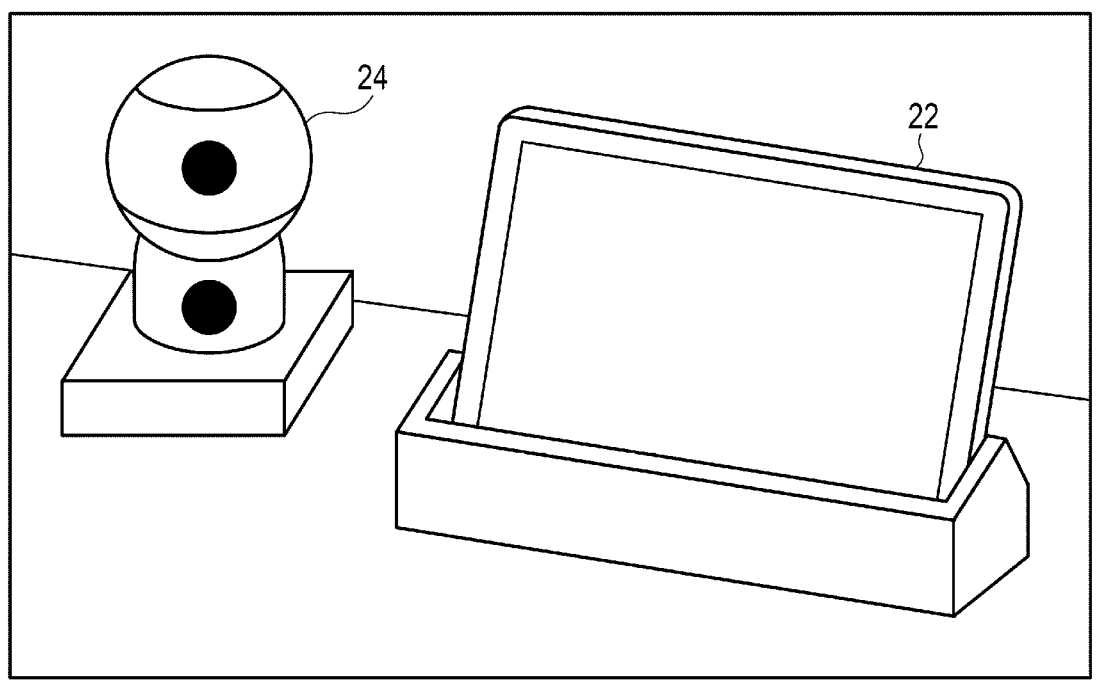
FIG. 5 is a diagram illustrating appearances of the order reception terminal and the table robot.

FIG. 5 is a diagram illustrating appearances of the order reception terminal 22 and the table robot 24 according to the present embodiment. FIG. 5 shows an arrangement of the order reception terminal 22 and the table robot 24 disposed side by side on a table.

Basically, the order reception terminal 22 is provided in a cradle on the table. The order reception terminal 22 can be taken from the cradle and is used in a state of being held by the customer, if necessary.

The table robot 24 is used to perform communication with the customer, and thus it is desirable that the table robot 24 is provided in a location close to a customer who takes the seat on the table. The table robot 24 performs an image capturing of an area, as an image capturing area, including at least a table on which an item (beverage, food, and the like) is placed. The table robot 24 may capture an image of an area, as an image capturing area, including not only the table on which the item is placed but also a customer who takes the seat on the table. Therefore, the table robot 24 is provided at a location at which the camera 24G can capture an image of an area set as an image capturing area.

In the table robot 24 illustrated in FIG. 5, for example, the camera 24G is provided in the upper housing, and thus can perform the capturing of the image of the image capturing area while the upper housing (camera 24G) is moved vertically and horizontally in a prescribed range by the driving mechanism 24L. Therefore, the camera 24G can capture an image of a wider area, as an image capturing area, compared with a case in which the camera 24G (upper housing) is fixed.

Subsequently, an operation of the order processing system according to the present embodiment is described.

In the order processing system, check-in processing of registering the customer is performed if the customer who visits the restaurant takes a seat on a table. The check-in processing is performed such that registration of the table number, input of the customer information (number of accompanying people, gender, age, job, and the like) and a prix fix menu ordered by the customer (Prix Fix Menu: a plurality of items served as a course dish, a time for the course, and the like are predetermined), and the like (for example, a special request by the customer) are input. The customer information may be input, for example, through the operation on the handy terminal 20 performed by the clerk who carries the handy terminal 20, or through the operation on the order reception terminal 22 performed by the customer.

In addition, the customer information may also be input such that a video (imaging data) captured by the camera of the table robot 24 is transmitted to the hall controller 16, the hall controller 16 (or the tablet terminal 16K) displays the video, and thus the customer information is input by a clerk who checks the video. Furthermore, the customer information may be input such that the hall controller 16 performs person authentication processing on an image acquired by photographing the customer to detect the number of people, gender, age, job, and the like, and a result of the detection is input as the customer information.

When the customer orders an item after the customer takes the seat, the customer performs the order of the item through the order reception terminal 22, instead of requesting the order to the clerk who carries the handy terminal 20. The order reception terminal 22 displays the menu on the touch panel 22G, and transmits the order information of the item designated through the touch-operation on the menu, to the order station 10. The menu is displayed such that a usual menu indicating all items which are categorized, a recommendation menu including a specific recommendation item prepared in advance as a today's special and the like are alternately displayed in a switching manner in response to the input operation by the customer.

The ordered item is delivered to the table by the floor robot 26 or the clerk. For example, if a table, i.e., delivering destination, is designated after items, such as a glass (beverage) and a dish (food) are placed on the placing table, the floor robot 26 delivers the ordered items to the designated table by self-traveling in response to the input operation by the employee or the instruction from the hall controller 16 (or the table robot 24)

The hall controller 16 checks the situation of the table at which the customer takes the seat based on the image (video image) captured by the camera 24G of the table robot 24. In the present embodiment, the hall controller 16 discriminates an eating and drinking situation of the delivered items (beverage and food), that is, a progress of the eating and drinking by the customer based on the captured video (image), and outputs an instruction to move the floor robot 26 to the table at which the video image is captured to collect (bus) the articles, such as dishes, and glasses, and waste by the floor robot 26 at an appropriate timing. Hereinafter, processing of outputting the instruction to control the operation of the floor robot 26 (first embodiment, second embodiment, and third embodiment) is described.

First Embodiment

Figure 6:
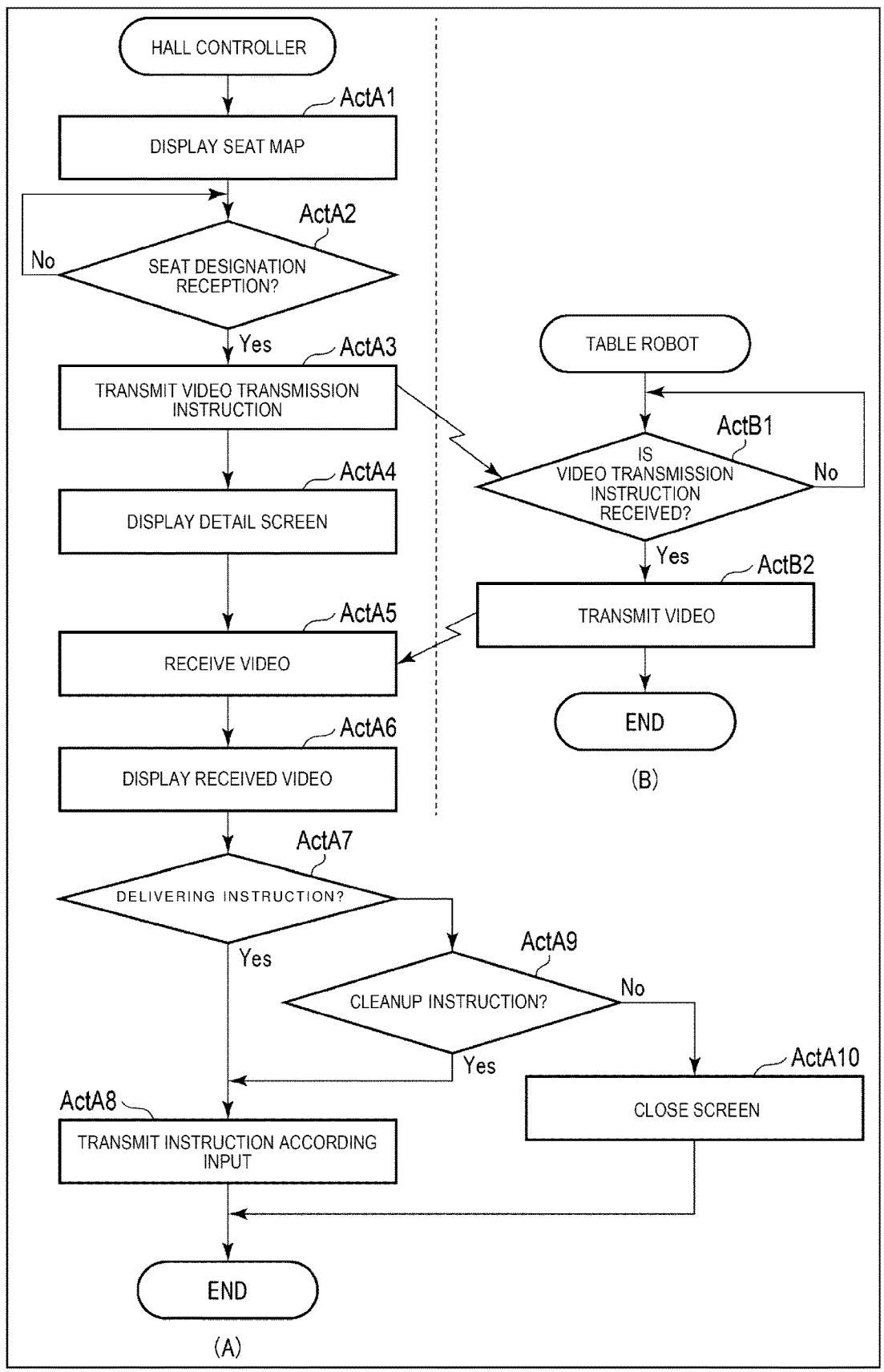
FIG. 6 is a flowchart illustrating processing performed by the hall controller and the table robot according to a first embodiment.

FIG. 6A is a flowchart illustrating processing performed by the hall controller 16 according to the first embodiment. FIG. 6B is a flowchart illustrating processing performed by the table robot 24 according to the first embodiment. If the order reception terminal 22 performs a function of the table robot 24, the processing in the flowchart illustrated in FIG. 6B is performed by the order reception terminal 22.

In the first embodiment, the camera 24G of the table robot 24 (or the order reception terminal 22) captures a video image indicating an area including the table on which at least an item is disposed as the image capturing area, and the hall controller 16 enables the employee to check the video image. The hall controller 16 outputs the instruction to control the operation of the floor robot 26 in response to the input operation by the employee who checks the video image.

The CPU 16A of the hall controller 16 manages a situation within the restaurant based on each input from the handy terminal 20, the order reception terminal 22, the table robot 24, and the floor robot 26. Therefore, the CPU 16A displays a screen showing the current situation in the restaurant in management in response to the input operation by the employee.

The CPU 16A displays a screen showing a status of seats including, for example, a floor map (seat map) indicating an arrangement of tables in the restaurant in response to the input operation by the employee (Act A1).

Figure 7:
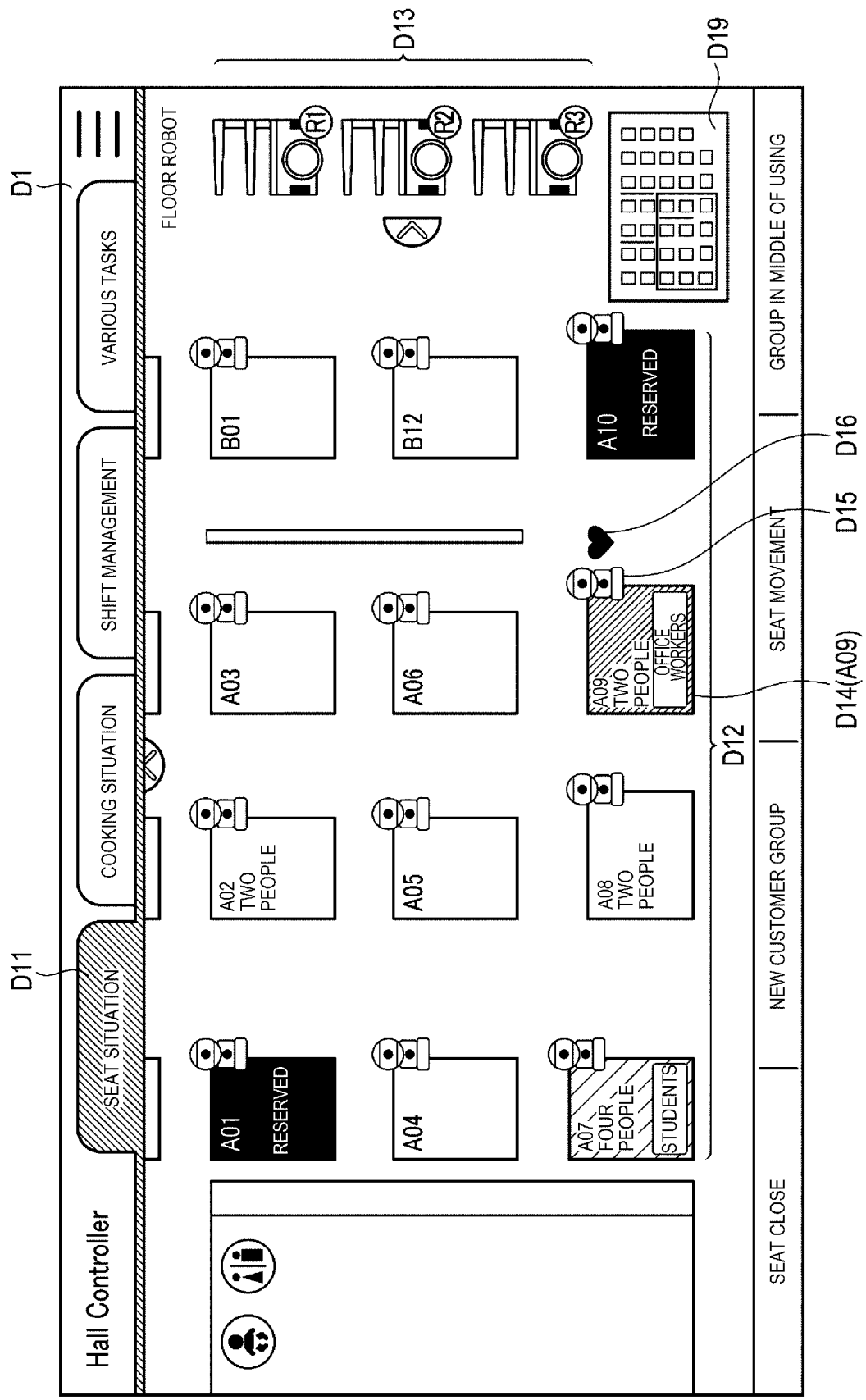
FIG. 7 is a diagram illustrating a screen for displaying a seat situation.

FIG. 7 is a diagram illustrating a screen D1 showing the status of seats displayed on the display device 16E or the touch panel 16G of the hall controller 16 or the tablet terminal 16K.

In the screen D1 showing the status of seats in FIG. 7, for example, a switching button D11, a table layout D12, a floor robot mark D13, a table mark D14 (A01 to A10), a table robot mark D15, a communication mark D16, and a table layout D19 are displayed. The switching button D11 is used to instruct to switch the screen, and includes buttons respectively corresponding to, for example, "cooking situation", "shift management", and "various tasks", in addition to a button "seat situation" corresponding to the screen shown in FIG. 7. The table layout D12 shows the arrangement of the plurality of tables (display target) in an area to be displayed in the restaurant. FIG. 7 shows a case in which 12 tables (display target) are respectively indicated with table numbers A01 to A10, B10, and B12. The table layout D12 is changed in accordance with the area, to be displayed, that is changed according to the input operation. The floor robot mark D13 indicates a location and an operation status of the floor robot 26 traveling in the restaurant. In FIG. 7, three floor robots 26 are used in the restaurant. The floor robot mark D13 is displayed at a position on the screen D1 corresponding to the current or actual location of the floor robot 26 traveling in the restaurant. The table mark D14 (A01 to A10, B10, and B12) indicates each table and the customer information thereof which is being managed. The table robot mark D15 indicates that the table robot 24 is disposed on the table. The communication mark D16 shows the number of times that the table robot 24 communicates with the customer. The communication between the table robot 24 and the customer includes, for example, conversation (response to an output voice message) with the table robot 24, an order of the item from the table robot 24, and the like. The table layout D19 shows the arrangement of all the tables in the restaurant, and specifies an area in which the table layout D12 is displayed.

If the CPU 16A of the hall controller 16 detects an operation of selecting one of the table marks D14 (Yes in Act A2), the CPU 16A transmits a video transmission instruction to the table robot 24 provided on the table corresponding to the detected table mark D14 (Act A3). In addition, the CPU 16A displays a screen (detail screen) for showing a detail of the relevant table on the display device 16E, the touch panel 16G, or the tablet terminal 16K (Act A4).

On the other hand, if the table robot 24 receives the video transmission instruction from the hall controller 16 (Yes in Act B1), the table robot 24 performs the capturing on the table, as an image capturing area, on which at least the item is disposed through the camera 24G. The table robot 24 transmits the imaging data captured (video image) to which, for example, data indicating the table number thereof is added, to the hall controller 16 through the communication device 24H (Act B2).

The CPU 16A of the hall controller 16 receives the video image from the table robot 24 (Act A5), and displays the received video image on the detail screen (Act A6).

Figure 8:
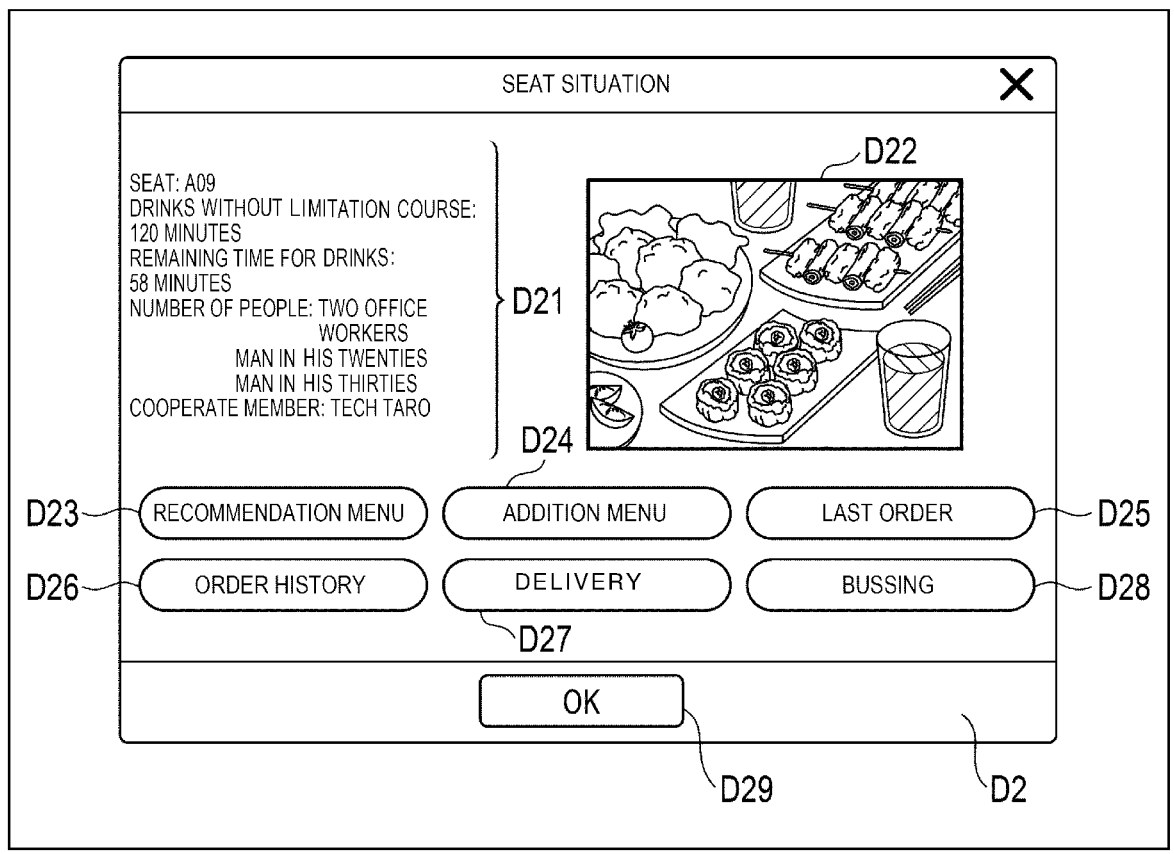
FIG. 8 is a diagram illustrating a detail screen (details of the seat situation).

FIG. 8 is a diagram illustrating a detail screen D2 (details of the seat situation).

The detail screen D2 shown in FIG. 8 includes, for example, customer management information D21, a video display area D22, and a plurality of buttons for selecting functions D23 to D29. The customer management information D21 shows information (ordered course and remaining time determined for the course) indicative of a current situation of the customer including the customer information and the like. In the video display area D22, a video image according to the imaging data received from the table robot 24 is displayed. The CPU 16A changes the display target area of the video by the operation on the video display area D22. For example, in an initial state, a video image of an area on the table is displayed among video images captured by the table robot 24. Subsequently, for example, if the touch operation is performed on the video display area D22, a video image including the whole table is displayed. If the touch operation is further performed, a video image including the customer who takes the seat is displayed. Therefore, the employee can display a video image corresponding to an area that the employee wants to observe and confirm the situation of the customer, including the progress of the course, from the video image on the screen.

The plurality of function selection buttons D23 to D29 includes, for example, a recommendation menu button D23, an addition menu button D24, a last order button D25, an order history button D26, a delivery button D27, a bussing (collecting) button D28, and an OK button D29. The recommendation menu button D23, the addition menu button D24, and the last order button D25 are used to output the recommendation information to the order reception terminal 22 in response to the input operation by the employee. The order history button D26 is used to display, for example, an order history for today in a listing form.

The delivering button D27 is used to instruct the floor robot 26 to deliver the item. The bussing button D28 is used to instruct the floor robot 26 to move to a designated table and to collect (bus) dishes, glasses, waste and the like from the table. The OK button D29 is used to instruct to end of the display of the detail screen D2.

If the CPU 16A of the hall controller 16 detects an operation on one of the buttons provided on the detail screen D2, the CPU 16A discriminates the one button used for instructing the operation of the floor robot 26, that is, the delivery button D27 or the bussing button D28. However, if the CPU determines that other button is touched (No in Act A7 and Act A9), the CPU 16A performs other processing according to the content of touched button, and ends the display of the detail screen D2 (Act A10).

On the other hand, if a touch-operation (cleanup instruction) performed on the bussing button D28 is detected (Yes in Act A9), the CPU 16A designates the table currently selected as the video display target as a traveling destination, and instructs the floor robot 26 to move to the table to collect (bus) the articles such as dished and grasses (Act A8).

Meanwhile, if the plurality of floor robots 26 are provided, the CPU 16A selects one of the floor robots 26 based on priorities preset to the plurality of floor robots 26, and may output an instruction to the selected floor robot 26.

In contrast, one of the plurality of floor robots 26 may be selected by the input operation by the employee. In this case, for example, in response to the input operation on the bussing button D28, the CPU 16A displays a selection screen on the display device 16E, the touch panel 16G or the tablet terminal 16K to select one of the floor robots 26.

Figure 9:
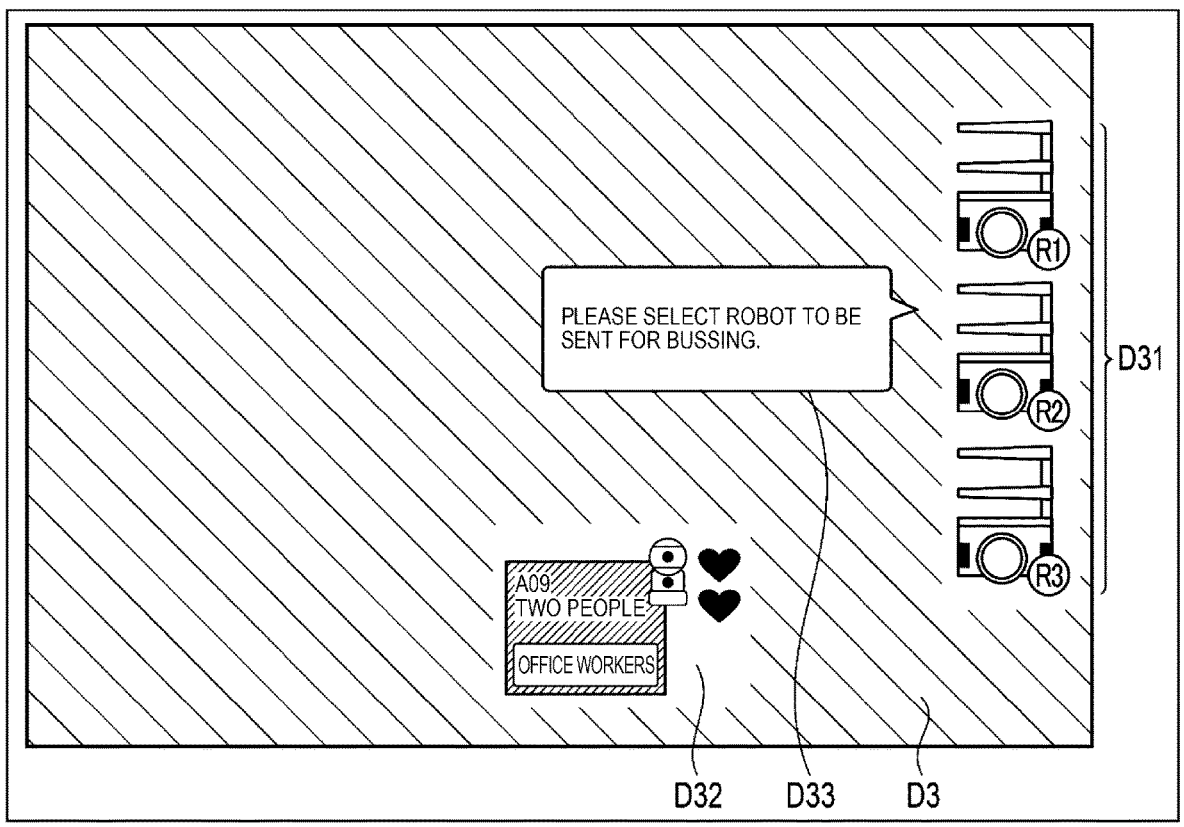
FIG. 9 is a diagram illustrating a selection screen for a floor robot.

FIG. 9 is a diagram illustrating the selection screen D3 for the floor robot 26.

The selection screen D3 illustrated in FIG. 9 specifies a floor robot mark D31 corresponding to each selectable floor robot 26, and a table mark D32 corresponding to a table which is the traveling destination of the floor robot 26. In addition, for example, "Select robot for bussing" is displayed as an operation guide message D33. Meanwhile, a floor robot 26 which is busy (now in traveling or already receiving another instruction) is not selectable, and thus the floor robot mark D31 corresponding to such floor robot 26 described above is not displayed.

If one of the floor robot marks D31 is selected on the selection screen D3 through the touch operation by the employee, the hall controller 16 instructs the selected floor robot 26 corresponding to the floor robot mark D31 touched to collect (bus) the articles on the table designated as a traveling destination.

Meanwhile, if the CPU 16A outputs the instruction to control the operation to the floor robot 26, the CPU 16A notifies that the instruction is output to the floor robot 26 to the handy terminal 20 carried by the clerk.

Similarly, if a touch operation performed on the delivery button D27 (delivery instruction) is detected (Yes in Act A7), the CPU 16A designates the table currently selected as the display target of the video as a traveling destination and instructs the floor robot 26 to travel to the table to deliver the item (Act A8).

If the delivery button D27 or the bussing button D28 is selected on the detail screen D2 but no floor robot 26 exist to receive an instruction, the CPU 16A notifies that the floor robot 26 is in busy state to the handy terminal 20, and therefore, the clerk can rapidly handle the situation instead of the floor robot 26.

In addition, if the floor robot 26 which is in operation exits at the time the CPU 16A of the hall controller 16 displays the screen D1 (floor map) showing the seat situation (Act A1), the CPU 16A displays the operational situation of the floor robot 26 on the floor map.

Figure 10:
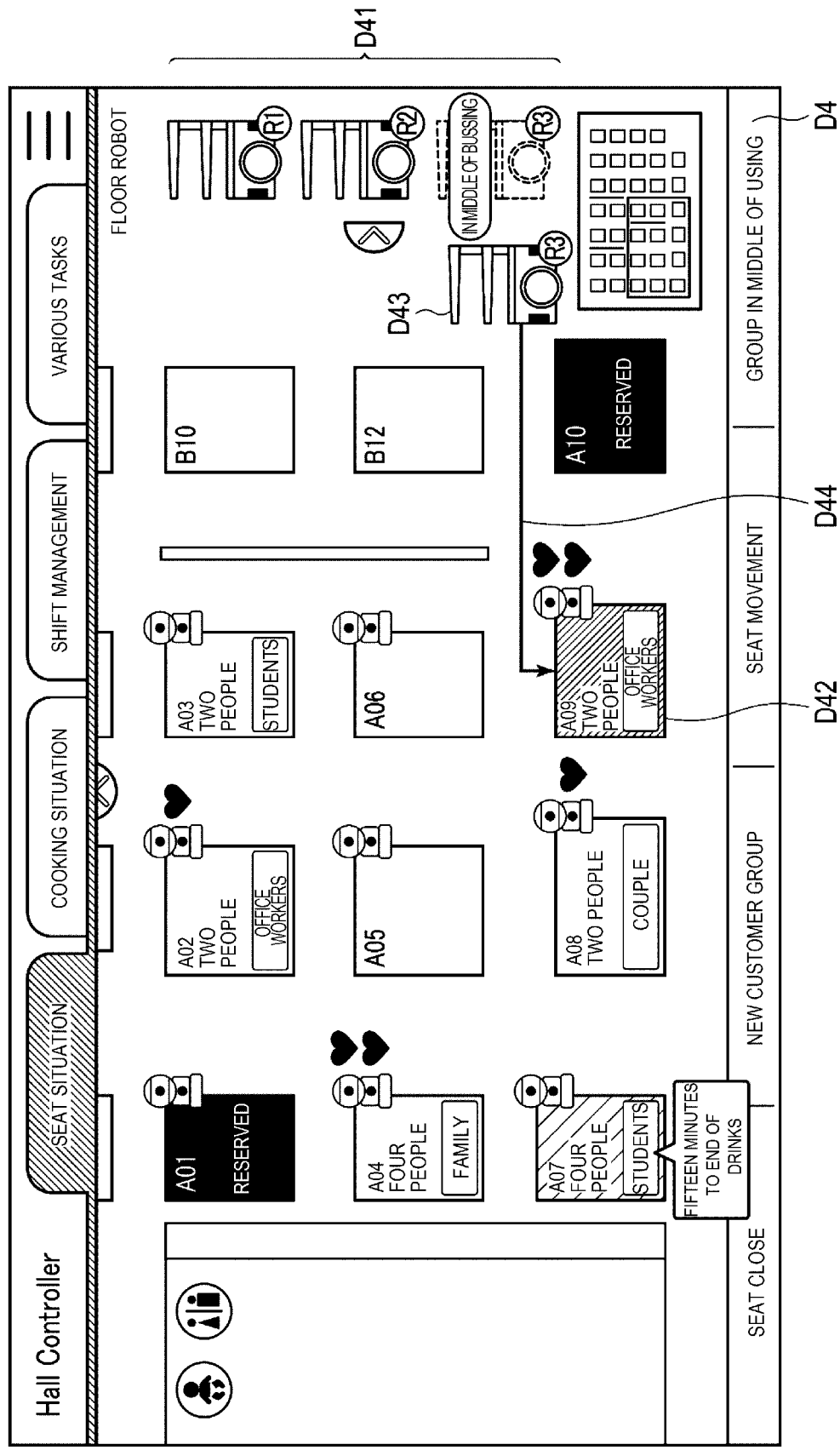
FIG. 10 is a diagram illustrating a screen for showing the seat situation.

FIG. 10 is a diagram illustrating a screen D4 for showing the seat situation indicating the operational situation of the floor robot 26.

The screen D4 showing the seat situation displays that, for example, one floor robot 26 (R3) is in operation to collect (bus) articles. A text message "in bussing", indicating an operation purpose, is added to the floor robot mark D41 in association with the floor robot 26 (R3) which is in operation. If the floor robot 26 (R3) is in operation for delivery, a text message "in delivering" is added. In addition, a path D44 up to a table mark D42 of a table, i.e., the traveling destination is displayed on the screen D4, and a floor robot mark D43 indicative of a current location of the floor robot 26 (R3) is also displayed. The display location of the floor robot mark D43 is changed based on the locational data indicative of the current location received from the floor robot 26 (R3), and thus the current location of the floor robot 26 (R3) in the restaurant can be indicated.

In this way, the clerk confirms the screen D4 showing the seat situation displayed on the hall controller 16, and can easily grasp the operational situation of the floor robot 26.

Figure 11:
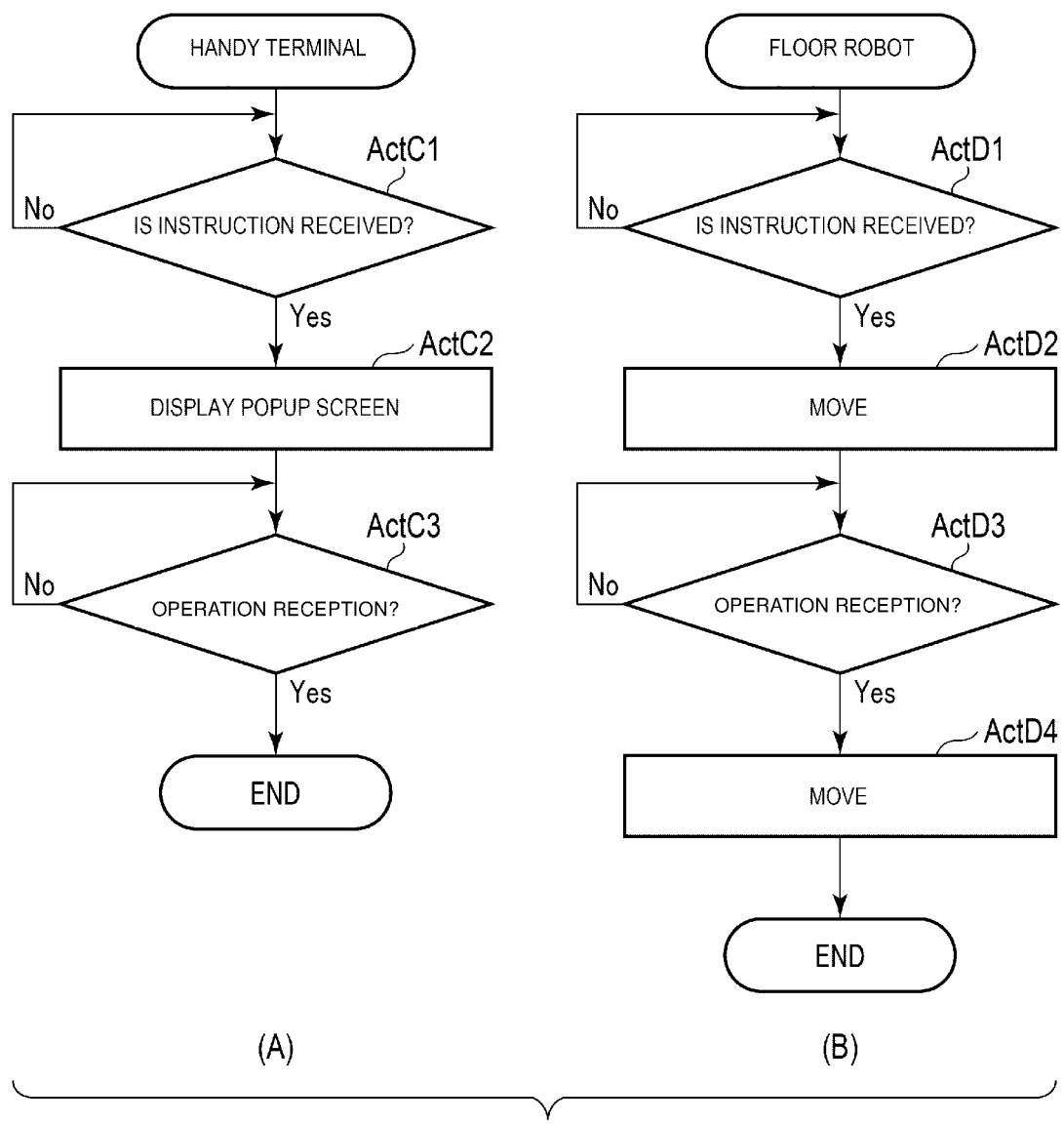
FIG. 11 is a flowchart illustrating processing performed by a handy terminal and the floor robot.

FIG. 11(A) is a flowchart illustrating processing performed by the handy terminal 20 according to the first embodiment. FIG. 11(B) is a flowchart illustrating the operation of the floor robot 26 according to the first embodiment.

If the handy terminal 20 receives the instruction from the hall controller 16 (Yes in Act C1), the handy terminal performs an output according to the content of the received instruction (Act C2). For example, the handy terminal 20 displays a pop-up screen on the display device to display the content of the instruction from the hall controller 16. The handy terminal 20 is not limited to use a display as an output form, but may use a sound, a vibration, or the like to inform of the reception of instruction from the hall controller 16 to the clerk.

The handy terminal 20 displays information (for example, "R3") for identifying the floor robot 26 which is in operation, a table number of the table which is the traveling destination, a traveling purpose, e.g., "bussing", and the like.

If it is informed from the hall controller 16 that the floor robot 26 cannot be used, the handy terminal 20 outputs a message to request the clerk to handle the situation described above instead of the floor robot 26. In this case, similarly to the above description, the table number, the traveling purpose, e.g., "bussing", and the like are displayed so that the clerk can rapidly handle the situation.

If the handy terminal 20 receives the input operation by the clerk against the display according to the instruction from the hall controller 16 (Yes in Act C3), the handy terminal 20 ends the processing described above. For example, the clerk confirms information of the operable floor robot 26, and inputs a response indicating that it is confirmed. In addition, if it is informed that the floor robot 26 cannot be used, the clerk inputs a response indicating that he or she handles the situation, or a response indicating that assistance is required to another clerk (handy terminal 20).

In contrast, if the floor robot 26 receives the instruction from the hall controller 16 (Yes in Act D1), the floor robot 26 sets up a path from the current location of its own to the target table based on the table number representing the traveling destination, to start a traveling control. The floor robot 26 notifies the locational data indicative of the current location of its own to the hall controller 16 as it travels along the path in the restaurant through the access point 18.

If the floor robot 26 travels to the location of the target table, the floor robot 26 outputs a message according to the purpose that the floor robot 26 performs to, for example, the customer.

In a case of a delivery purpose, for example, the floor robot 26 outputs, for example, a message "Thank you for waiting. Take the food (beverage), please" using voice, to urge the customer to take the item (food or beverage) on the placing table. It is possible to display the same message on the display device in addition to the message using voice. Similarly, in a case of the collecting purpose, the floor robot 26 outputs, for example, a message "Please put on unnecessary glasses or dishes, if any" using voice, to urge the customer to put unnecessary articles on the placing table.

If the floor robot 26 receives the input operation by the customer (Yes in Act D3), the floor robot 26 returns to, for example, an initial location or starts processing of traveling to a location of a subsequent target table (Act D4). For example, the floor robot 26 receives an operation indicating that reception of the food (beverage) by the customer is completed at the time of delivering, and receives an operation indicating that the unnecessary article is put on the placing table at the time of collecting. The floor robot 26 may input the operation from the customer with, for example, an operation performed on the touch panel, or a voice command (voice recognition).

In the above description, the floor robot 26 is instructed to perform one of the delivering and the collecting. However, both the delivering and the collecting may be instructed to the floor robot 26 at a time. For example, the floor robot 26 first travels to the table, e.g., delivering destination, to which an item is delivered, and then the floor robot 26 further travels to another table at which the collecting is performed. In addition, the floor robot 26 may be instructed to travel to a plurality of tables as a traveling destination for the purpose of collecting. Therefore, the floor robot 26 can be worked efficiently.

In this way as described above, in the order processing system according to the first embodiment, the table robot 24 provided at each table captures an image capturing area including the table and the employee confirms the video image captured by the table robot 24 on the hall controller 16 to instruct the floor robot 24 to travel to the table selected as a display target on the video image. On the hall controller 16, the employee arbitrary selects a table on the screen D1 showing the seat situation and the video image including the selected table can be displayed in the video display area D22 of the detail screen D2. Accordingly, the employee confirms progress of the prix fix menu (eating and drinking), the state of the customer, and the like for each table, and can instruct the floor robot 26 to travel in the restaurant by a simple operation, at an appropriate timing. In the order processing system of the present embodiment, various instructions are output to the plurality of floor robots 26 through the hall controller 16 and the operational situations are collectively displayed on the screen D4 which shows the seat situation. Therefore, an easy management by the order processing system can be achieved.

Second Embodiment

Figure 12:
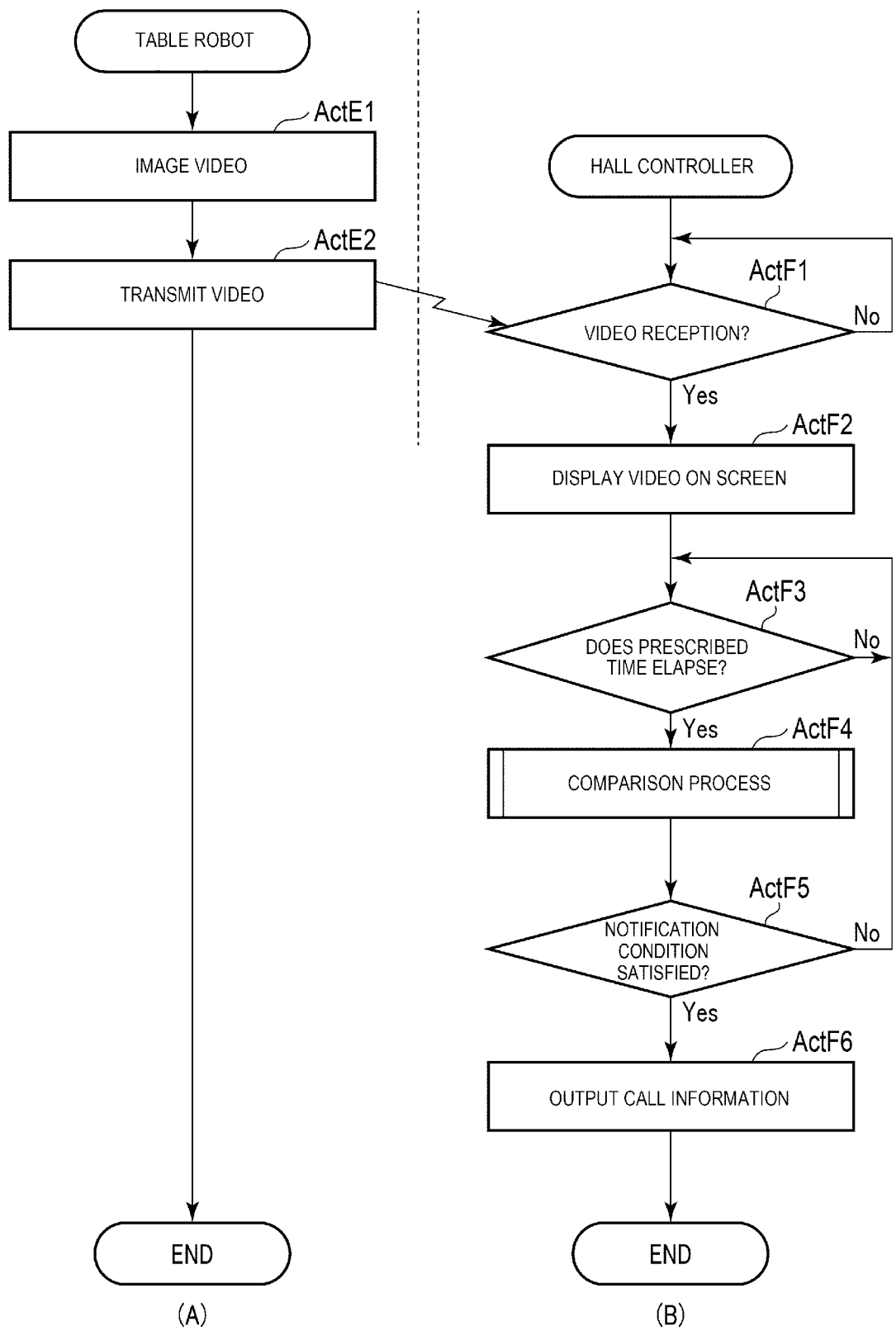
FIG. 12 is a flowchart illustrating processing performed by a table robot and a hall controller according to a second embodiment.

FIG. 12(A) is a flowchart illustrating processing performed by the table robot 24 according to a second embodiment. FIG. 12(B) is a flowchart illustrating processing performed by the hall controller 16 according to the second embodiment. If the order reception terminal 22 performs the function of the table robot 24, instead of the table robot 24, the processing of the flowchart illustrated in FIG. 12(A) is performed by the order reception terminal 22.

In the second embodiment, the camera 24G of the table robot 24 (or order reception terminal 22) captures a video image of at least a table on which the item is disposed as the image capturing area, and the eating and drinking situation of the delivered item (beverage or food), that is, the consumption situation of the item (a state in which the residual quantity is small or noting remains) by the customer is detected based on the captured video image. Furthermore, an instruction for collecting (bus) the article is output to the floor robot 26 at an appropriate timing based on the result of the detection.

The table robot 24 performs the image capturing by the camera 24G thereof after the item is delivered to the table (Act E1), and then adds data indicating, for example, the table number to the captured video image to transmit the imaging data of the video image with the data to the hall controller 16 through the communication device 24H (Act E2).

If the CPU 16A of the hall controller 16 receives the imaging data transmitted from the table robot 24 (Yes in Act F1), the CPU 16A displays the video image based on the imaging data. For example, similarly to the first embodiment, the CPU 16A displays the video image in the video display area D22 of the detail screen D2 (Act F2). The CPU 16A extracts a first image from the video image received from the table robot 24, for example, just after the item is delivered, and stores the first image in the RAM 16C or the storage device 16D in association with the table number. The first image extracted shows an initial state of the item which is not consumed by the customer.

If the CPU 16A determines that a prescribed time elapses after the CPU 16A stores the first image (Yes in Act F3), the CPU 16A extracts a second image from the video image received from the table robot 24, and performs comparison processing of the first image and the second image (Act F4).

Meanwhile, the prescribed time may be a predetermined fixed time or may be varied according to a time which elapses from a time at which the check-in process is performed for the customer. If the prescribed time is varied, the prescribed time is set to a short time (for example, for three minutes) in a case in which, for example, eating and drinking pace of the customer is fast or in a time zone (for example, 0 to 15 minutes) immediately after the start of having an item. The closer the end where an item order interval generally becomes wide, the longer the prescribed time. For example, the prescribed time may be set to 5 minutes in a time zone of 15 to 30 minutes from the start and may be set to 10 minutes in a time zone of 30 to 60 minutes. In this way, processing loads may be reduced in such a way that the floor robot 26 travels for collection of articles at the appropriate timing rather than that the articles such as glass, dish, and the like becomes empty (beverage and food are consumed) or in such a way that a frequency in execution of the image processing is reduced in a time zone where the item consumption pace becomes slow.

Figure 13:
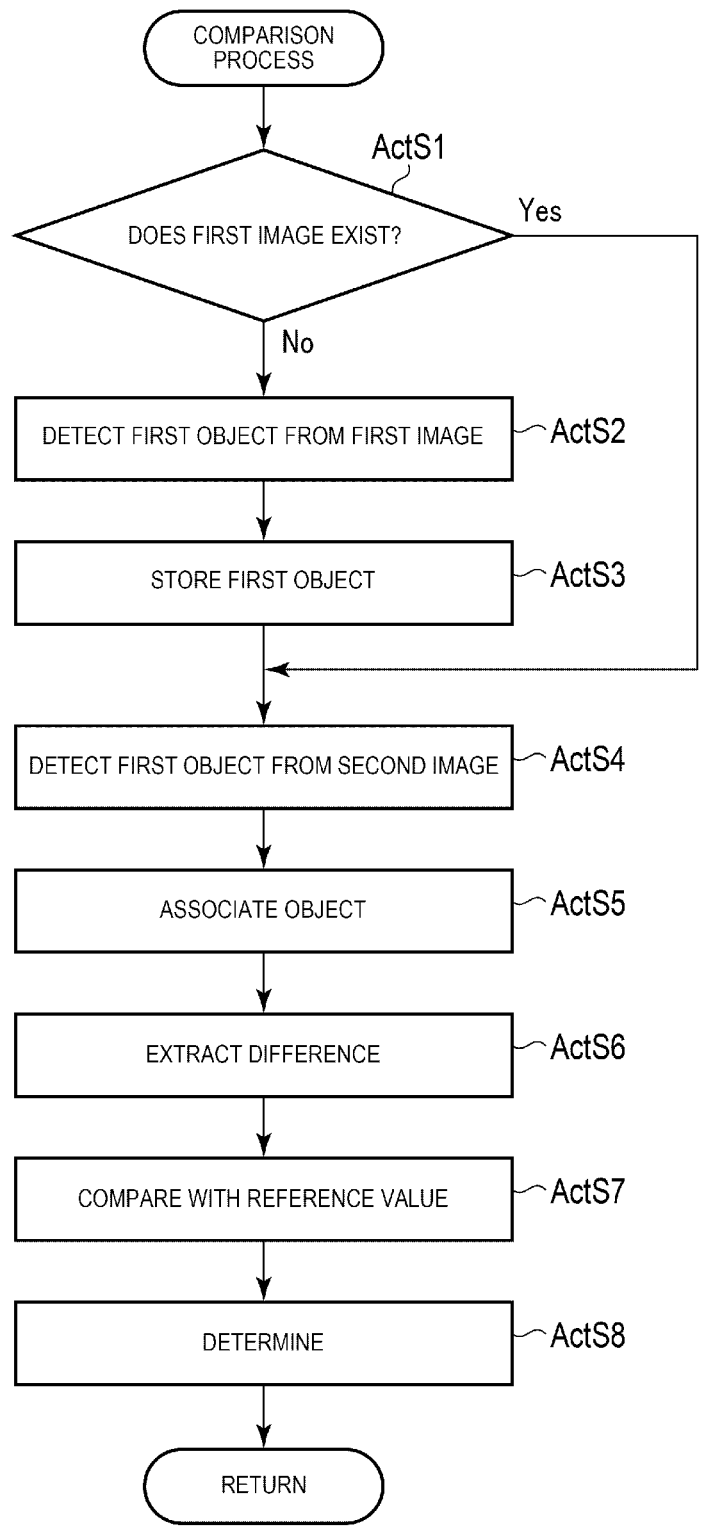
FIG. 13 is a flowchart illustrating comparison processing performed by the hall controller.

FIG. 13 is a flowchart illustrating the comparison processing performed by the hall controller 16.

First, the CPU 16A determines whether or not the first image is already stored and an object detection described below with respect to the first image is completed. If the first image is not stored in advance (NO in Act S1), the CPU 16A detects an object image (first object) corresponding to an item delivered to the customer, from the first image (Act S2), and stores the first object in the RAM 16C or the storage device 16D (Act S3).

Figure 14:
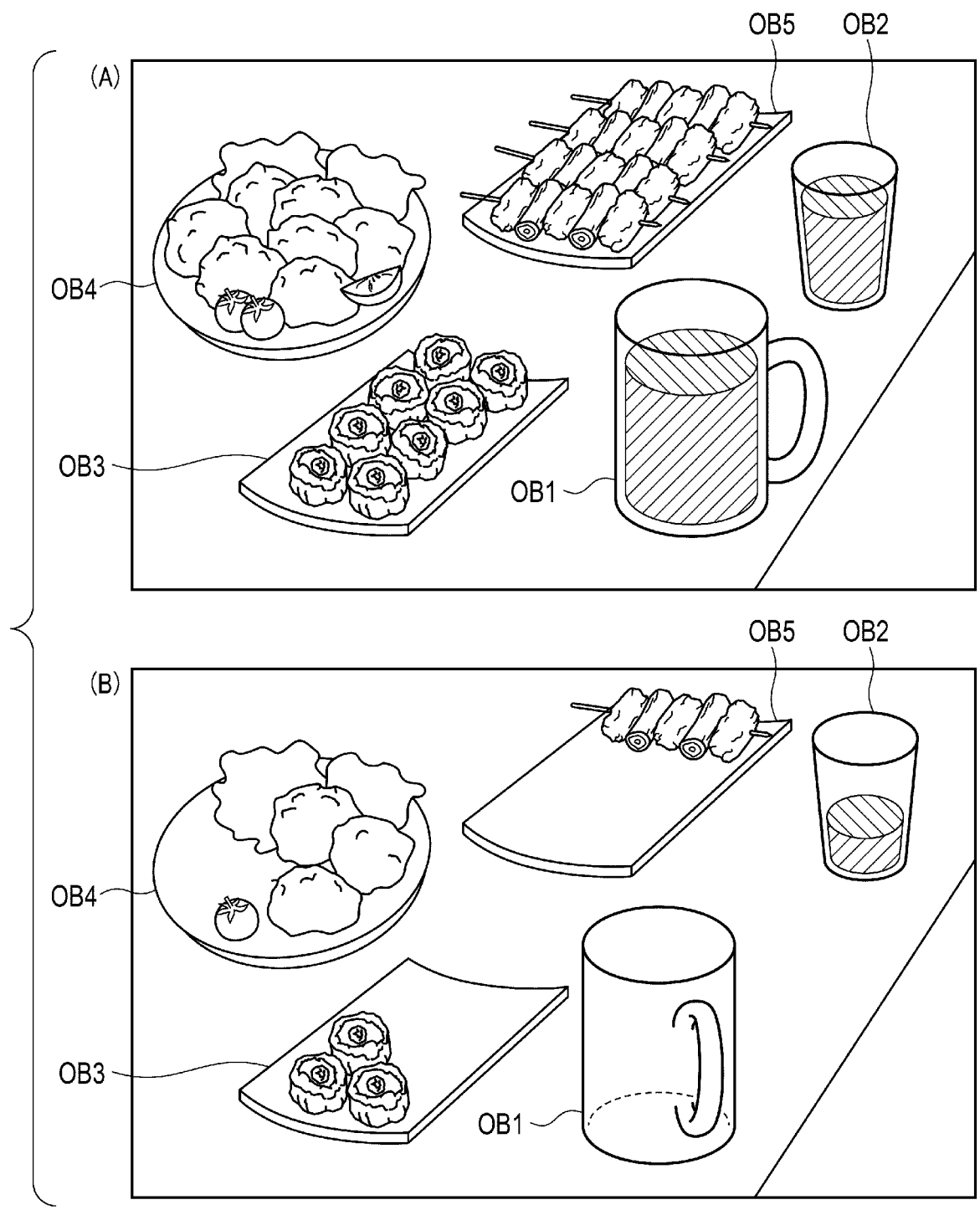
FIG. 14 is a diagram conceptually illustrating a first image and a second image captured by the table robot.

FIG. 14(A) is a diagram conceptually illustrating the first image. As illustrated in FIG. 14(A), there is a case in which the first image captured by the camera 24G of the table robot 24 includes images respectively corresponding to a plurality of items. The CPU 16A detects images corresponding to the respective commodities as an object, and stores the images in association with identification labels different for the respective objects. Meanwhile, as image processing method for detecting an object in an image, for example, characteristics data indicative of a feature, such as a shape and a color, of the object, i.e., detection target, in advance and detection is performed based on the characteristics data. Also, another existing image processing method can be utilized.

In the embodiment illustrated in FIG. 14(A), objects OB1 and OB2 corresponding to, for example, beverages (a beer mug and a glass) and objects OB3, OB4, and OB5 corresponding to food are detected.

In addition, the CPU 16A detects an object image (second object) corresponding to the item delivered to the customer, from the second image in a similar manner to that from the first image (Act S4), and stores the second object in the RAM 16C or the storage device 16D.

FIG. 14(B) is a view illustrating the second image. In the embodiment shown in FIG. 14(B), the objects OB1 to OB5 are detected, in a similar manner to that from the first image. However, as shown in FIG. 14(B), the second image is extracted after prescribed time elapses from the capturing of the first image, and therefore, items are consumed because eating and drinking by the customer proceeds. In addition, locations on the table at which the objects OB1 and OB2 (beer mug and glass) corresponding to the beverages are placed are altered by the customer as the eating and drinking proceeds. Note that the second image is construed as an image acquired by capturing again in the same area in which the first image is captured after the prescribed time elapses from the time at which the first image is captured.

In order to detect changes of respective items (residual quantities) in the progress of eating and drinking, the CPU 16A associates the plurality of first objects included in the first image with the plurality of second objects included in the second image (Act S5). That is, even if the locations of the articles (beer mug and glass) on the table are different between the time at which the first image is captured and the time at which the second image is captured, the changes in respective items (foods and beverages) can be detected.

The CPU 16A performs a comparison for each combination of the first object and the second object associated with each other to extract a difference therebetween (Act S6). In other words, the CPU 16A detects a change between the state of the item acquired at the time of capturing the first image and the state of the item acquired at the time of capturing the second image.

The CPU 16A compares the difference for each combination of the first object and the second object with a preset reference value (Act S7), and determines whether or not the difference exceeds the reference value (Act S8). The reference value is used to discriminate a state in which the items are consumed enough, in other words, a state in which a remaining quantity of the item is smaller than a preset prescribed value or noting remains. That is, reference value is used to determine whether there is a bowl to be empty before long or there is an empty bowl to be collected. Meanwhile, a part corresponding to the remaining quantity of the item may be detected based on the difference between the first object and the second object. In this case, the reference value is set to discriminate the remaining quantity, the reference value is compared with the remaining quantity, and thus the state, in which the remaining quantity of the item is smaller than the preset prescribed value or nothing remains, is discriminated. In addition, the reference value may be set for each category of the object (beverage or food) or may be set for each item if the item can be identified at the time of detection of the object.

The CPU 16A determines whether or not a notification condition of operating the floor robot 26 is satisfied based on a result of the comparison processing. As a result of the comparison between the first object and the second object, if an object (item) which has the difference exceeding the reference value, it is determined that the notification condition is satisfied. The CPU 16A may determine that the notification condition is satisfied if the difference of at least one object exceeds the reference value or if differences of a predetermined number of objects exceed the reference value.

In the above-described comparison processing, the difference between the first image (first object) and the second image (second object) is extracted, and the state of the item is determined based on the difference. However, the state of the item may be determined by another method. For example, for each of the plurality of commodities, characteristics amount of image of the item captured for each of the plurality of items is registered in advance as dictionary data, and the dictionary data is compared with the images of the respective objects extracted from the second image. It may determine whether or not a degree of similarity of the image of the object and the dictionary data is below a prescribed reference value, that is, whether or not a state of which the consumption of the item is large enough.

If it is determined that the notification condition is not satisfied (No in Act F5), the CPU 16A extracts the second image from the video image similarly to the above description after the prescribed time elapses from the extraction of previous second image (Yes in Act F3), and determines whether or not the notification condition for operating the floor robot 26 is satisfied through the comparison between the first image and the second image (Act F4 and Act F5).

In the second and subsequent comparison processing, the first image is already received (Yes in Act S1 in FIG. 13), the CPU 16A omits the processing of detecting the first object from the first image (Acts S2 and S3). However, if an additional item is delivered, thereafter, the first image is stored and the first object is extracted. In this case, the CPU 16A extracts an object corresponding to the added item from the first image, and stores the added item similarly to other objects. With regard to the second object disappearing from the second image, the first object corresponding to the second object is deleted as it is assumed that the item is consumed and the article such as a dish or a bowl is already collected.

If it is determined that the notification condition is satisfied (Yes in Act F5), the CPU 16A determines that there is, for example, a bowl the remaining quantity in which is small or nothing remains, and the CPU 16A designates a table, as a traveling destination, which is currently selected as the display target in the Video image and outputs call information for instructing the floor robot 26 to travel to collect (bus) the article to the floor robot 26 (Act F6). If the plurality of floor robots 26 is prepared, the CPU 16A selects one of floor robots 26 based on priorities preset to the plurality of floor robots 26, and outputs the call information to the selected floor robot 26.

When the CPU 16A outputs the call information to the floor robot 26, the CPU 16A outputs the call information to the handy terminal 20 carried by the clerk, similarly to the first embodiment. If no operable floor robot 26 exists, the CPU 16A notifies a state in which no usable floor robot 26 exists, to the handy terminal 20.

In this way, even though the input operation is not performed by the employee, the hall controller 16 detects a state in which the floor robot 26 is ready to travel to collect the article based on the video image received from the table robot 24, and can instructs the floor robot 26 to travel for the collection.

Figure 15:
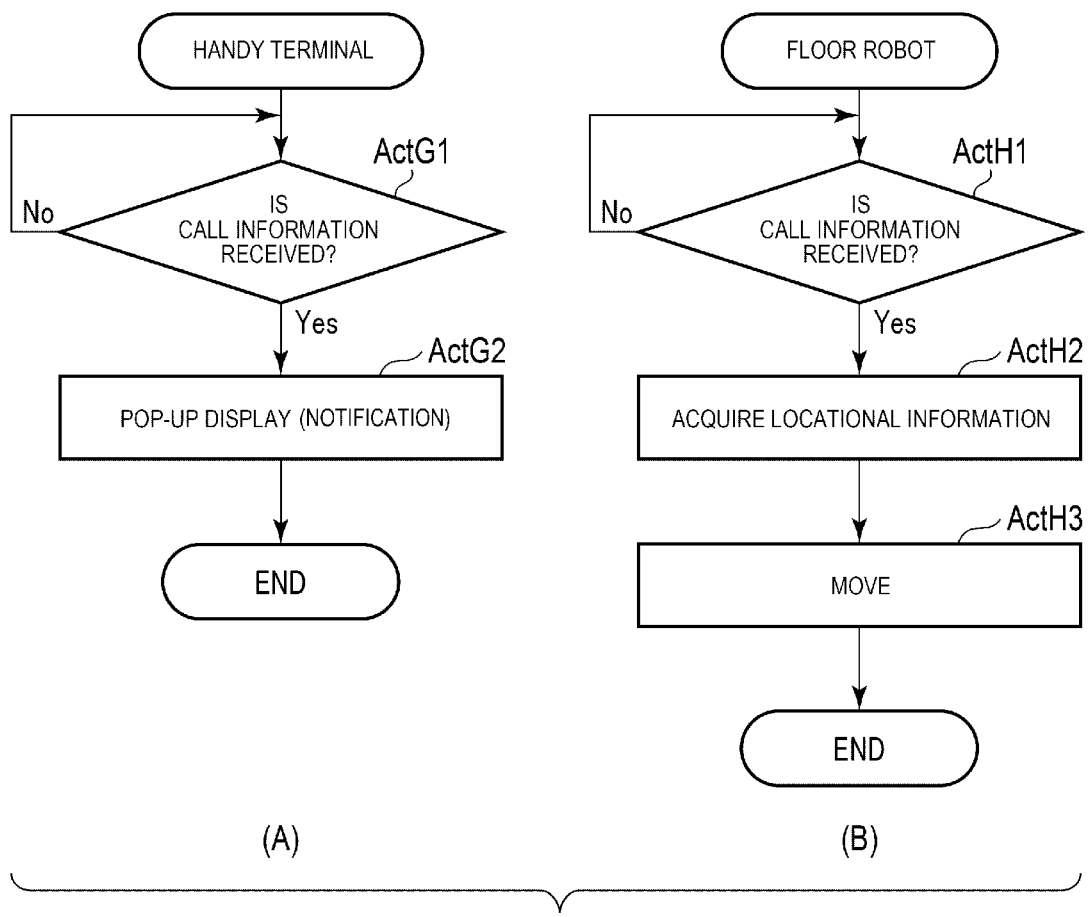
FIG. 15 is a flowchart illustrating processing performed by a handy terminal and a floor robot.

FIG. 15(A) is a flowchart illustrating processing performed by the handy terminal 20 according to the second embodiment. FIG. 15(B) is a flowchart illustrating processing performed by the floor robot 26 according to the second embodiment.

If the call information is received from the hall controller 16 (Yes in Act G1), the handy terminal 20 performs an output according to the reception (Act G2). For example, the handy terminal 20 displays a pop-up screen on the display device to display content of the instruction from the hall controller 16. An output form of the handy terminal 20 is not limited to the display, but the hall controller 16 may use a sound output or a vibration. The clerk notices the reception from the hall controller 16 with the sound or the vibration. The operation of the handy terminal 20 is performed similarly to the case of collecting (bussing) according to the first embodiment, and thus the operation is not described in detail.

In contrast, if the floor robot 26 receives the call information from the hall controller 16 (Yes in Act H1), the floor robot 26 receives location information (table number indicative of the traveling destination), sets a path from the current location to the target table, and starts a movement control. The operation of the floor robot 26 is performed similarly to the case of collecting (bussing) according to the first embodiment, and thus detail of the operation is not described.

As described above, in the order processing system according to the second embodiment, the state, in which the remaining quantity of the item on the table is small or nothing remains, is detected based on the video image captured by the table robot 24 provided on each table, and an instruction for collecting (bus) the article can be output to the floor robot 26. Accordingly, the floor robot 26 can be traveled to collect articles at an appropriate timing according to the consumption situation of items for each table without increasing an operational load of the employee.

Third Embodiment

Figure 16:
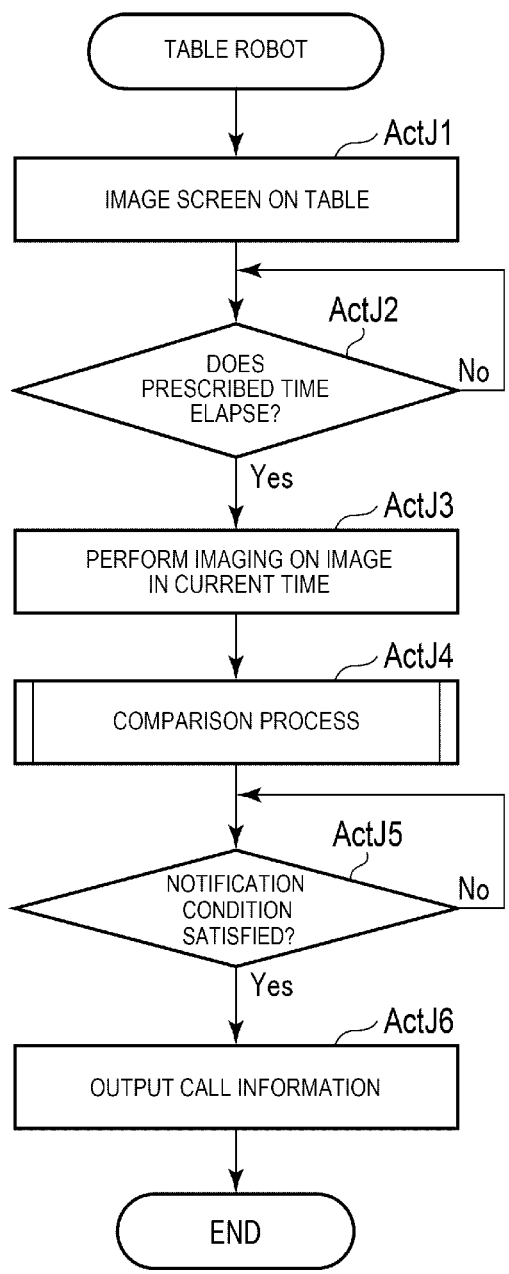
FIG. 16 is a flowchart illustrating processing of a table robot according to a third embodiment.
Figure 17:
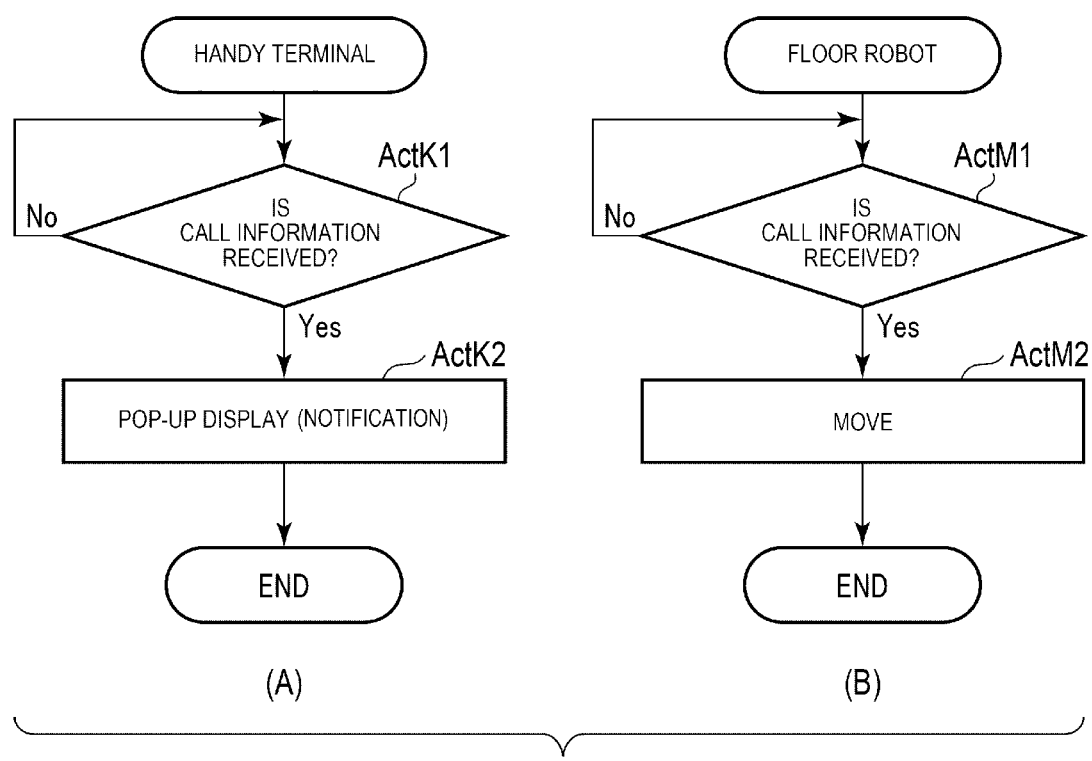
FIG. 17 is a flowchart illustrating processing of a handy terminal and a floor robot.

FIG. 16 is a flowchart illustrating processing performed by the table robot 24 (or order reception terminal 22) according to a third embodiment. FIG. 17(A) is a flowchart illustrating processing performed by the handy terminal 20 according to the third embodiment. FIG. 17(B) is a flowchart illustrating the operation of the floor robot 26 according to the third embodiment.

In the third embodiment, the processing, performed by the hall controller 16, which is described according to the second embodiment, is performed by the table robot 24. The table robot 24 is operated as the information processing apparatus which performs processing to control and manage the floor robot 26. The processing performed by the table robot 24 may be performed by a combination in which the order reception terminal 22 or the order reception terminal 22 is combined with table robot 24, instead of the table robot 24.

The CPU 24A of the table robot 24 performs the capturing of image by the camera 24G after the item is delivered to the table (Act J1), and stores the captured image as the first image in the RAM 16C or the storage device 16D in association with the table number.

If the CPU 24A determines that the prescribed time elapses after the CPU 24A stores the first image (Yes in Act J2), the CPU 24A captures the second image (Act J3), and performs the comparison processing for comparing the first image with the second image (Act F4). The comparison processing is performed similarly to the second embodiment, and thus a detailed description is not performed.

Similarly to the second embodiment, if it is determined that a notification condition for operating the floor robot 26 is satisfied based on the result of the comparison processing (Yes in Act J5), the CPU 24A outputs the call information for instructing to travel to collect (bus) the article to the floor robot 26 (Act J6). At this time, the CPU 24A performs the table at which the table robot 24 is provided as the traveling destination. If the plurality of floor robots 26 are provided, the CPU 16A selects one of the floor robots 26 based on the priorities preset to the plurality of floor robots 26, and outputs the call information to the selected floor robot 26.

Similarly to the second embodiment, when the CPU 24A outputs the call information to the floor robot 26, the CPU 24A outputs the call information to the handy terminal 20 carried by the clerk.

The table robot 24 may output the call information not to the hall controller 16 directly but to the floor robot 26. The hall controller 16 outputs the call information for instructing to the floor robot 26 to travel to the table, i.e., transmission source of the call information, designated as a traveling destination, to collect (bus) articles on the table according to the call information from the table robot 24. In this case, if the plurality of floor robots 26 are provided, the hall controller 16 select one of the floor robots 26 based on the priorities preset to the plurality of floor robots 26, to output the call information to the selected floor robot 26. Furthermore, if the hall controller 16 receives the call information from the table robots 24 respectively provided on the plurality of tables, the hall controller 16 performs scheduling so that the floor robot 26 can travel to the plurality of tables to collect articles on the tables, and then the hall controller 16 may output the instruction to the floor robot 26. For example, the hall controller 16 sets the tables and the traveling paths in order based on the arrangement of the tables and the like so that one floor robot 26 can effectively collect articles on the plurality of tables, and instructs the floor robot 26 to travel to the plurality of tables.

When the handy terminal 20 receives the call information from the table robot 24 (or the hall controller 16) (Yes in Act K1), the handy terminal 20 performs an output according to the received call information (Act K2). The operation of the handy terminal 20 is performed similarly to that at the time of collecting (bussing) in the second embodiment, and thus is not described in detail.

In contrast, if the floor robot 26 receives the call information from the hall controller 16 (Yes in Act M1), the floor robot 26 sets a path from the current location to the table corresponding to the transmission source of the call information, and starts the traveling control (Act M2). The operation of the floor robot 26 is performed similarly to that at the time of collecting (bussing) in the second embodiment, and thus is not described in detail.

As described above, in the order processing system according to the third embodiment, the state of the item (in the article) on the table is detected, whether the residual quantity of the item is small or nothing remains, based on an image of the table, captured by the table robot provided on each table, and the instruction for collecting (bus) the article on the table is output to the floor robot 26. Accordingly, the floor robot 26 can be called to collect the article on the table at an appropriate timing according to the state of the item without performing the input operation on the order reception terminal 22 or the table robot 24 by the customer.

In the description of the above-described embodiments, the camera is provided to the table robot 24 and the order reception terminal 22 to perform an image capturing. However, one or more cameras are provided in the vicinity (including an upper part) of the table separately from that of the table robot 24 or the order reception terminal 22, and an image capturing may be performed, for example, on an area on the table or the vicinity of an area including the table and a customer who is in the vicinity of the table as an image capturing area.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

In addition, in the processing described in the above-described embodiments, it is possible to write a program capable of being executed by the computer in, for example, a recording medium, such as a magnetic disk (a flexible disk, a hard disk, or the like), an optical disk (a CD-ROM, a DVD, or the like), or a semiconductor memory, and to provide the program to various devices. In addition, it is possible to transfer the program through a communication medium and to provide the program to the various devices. The computer reads the program recorded in the recording medium or receives the program through the communication medium, and performs the above-described processes in such a way that an operation is controlled by the program.

What is claimed is:

1. A robot service providing system comprising:
   a table monitoring terminal associated with one of a plurality of tables in a service location and including:
      a camera;
      a first communication interface; and
      a first controller configured to control the first communication interface to transmit image data of an image of said one of the tables captured by the camera;
   a movable waiter robot; and
   a central control terminal including:
      a second communication interface communicable with the first communication interface;
      a display;
      an operation panel; and
      a second controller configured to:
         control the display to display a first screen including an image based on the image data received by the second communication interface;
         control the second communication interface to transmit a service instruction in response to a user operation on the operation panel, the service instruction causing the movable waiter robot to move to said one the tables and return to an original location of the movable waiter robot;
         control the display to display a second screen including a table map of the service location, in which a current location of the movable waiter robot and a type of a service being provided by the movable waiter robot are indicated;
         control the second communication interface to transmit an image data request to the first communication interface in response to selection of the one of the tables in the table map using the operation panel; and
         control the display to display the first screen after the image data request is transmitted.

2. The robot service providing system according to claim 1, wherein the table map also includes the original location of the movable waiter robot, a destination of the movable waiter robot, and a route of the movable waiter robot to the destination.

3. The robot service providing system according to claim 1, wherein
   the second controller is further configured to control the display to display a robot selection screen, and
   the user operation includes a selection of one of a plurality of movable waiter robots using the robot selection screen.

4. The robot service providing system according to claim 1, wherein the second controller is further configured to select the movable waiter robot from a plurality of movable waiter robots in accordance with a predetermined priority rule.

5. The robot service providing system according to claim 1, wherein the movable waiter robot is further configured to output at least one of an audio and a visual message when the movable waiter robot arrives at said one of the tables.

6. The robot service providing system according to claim 1, wherein the movable waiter robot includes an operation panel operable when the movable waiter robot arrives at said one of the tables.

7. The robot service providing system according to claim 1, wherein the first screen includes a selectable object of which selection by the user operation causes transmission of the service instruction by the second communication interface.

8. The robot service providing system according to claim 1, wherein the type of the service includes delivery of an item to the one of the tables.

9. The robot service providing system according to claim 1, wherein the type of the service includes collection of an item from the one of the tables.

10. A robot service providing system comprising:
a table monitoring terminal associated with one of a plurality of tables in a service location and including:
a camera;
a first communication interface; and
a first controller configured to control the first communication interface to transmit image data of an image of said one of the tables captured by the camera;
a movable waiter robot; and
a central control terminal including:
a second communication interface communicable with the first communication interface;
a display;
an operation panel; and
a second controller configured to:
control the display to display a first screen including an image based on the image data received by the second communication interface;
control the second communication interface to transmit a service instruction in response to a user operation on the operation panel, the service instruction causing the movable waiter robot to move to said one the tables and return to an original location of the movable waiter robot;
control the display to display a second screen indicating a current location of the movable waiter robot and a type of a service being provided by the movable waiter robot, wherein the second screen includes a table map of the service location, in which the current location of the movable waiter robot is indicated;
control the second communication interface to transmit an image data request to the first communication interface in response to selection of the one of the tables in the table map using the operation panel; and
control the display to display the first screen after the image data request is transmitted.

11. The robot service providing system according to claim 10, wherein the type of the service being provided by the movable waiter robot is also indicated in the table map.

12. The robot service providing system according to claim 10, wherein the table map also includes the original location of the movable waiter robot, a destination of the movable waiter robot, and a route of the movable waiter robot to the destination.

13. The robot service providing system according to claim 10, wherein
the second controller is further configured to control the display to display a robot selection screen, and
the user operation includes a selection of one of a plurality of movable waiter robots using the robot selection screen.

14. The robot service providing system according to claim 10, wherein the second controller is further configured to select the movable waiter robot from a plurality of movable waiter robots in accordance with a predetermined priority rule.

15. The robot service providing system according to claim 10, wherein the movable waiter robot is further configured to output at least one of an audio and a visual message when the movable waiter robot arrives at said one of the tables.

16. The robot service providing system according to claim 10, wherein the movable waiter robot includes an operation panel operable when the movable waiter robot arrives at said one of the tables.

17. The robot service providing system according to claim 10, wherein the first screen includes a selectable object of which selection by the user operation causes transmission of the service instruction by the second communication interface.

18. The robot service providing system according to claim 10, wherein the type of the service includes delivery of an item to the one of the tables.

19. The robot service providing system according to claim 10, wherein the type of the service includes collection of an item from the one of the tables.

* * * * *